United States Patent [19]
Grimsley

[11] Patent Number: 6,137,753
[45] Date of Patent: Oct. 24, 2000

[54] RUNOUT CALIBRATION FOR DISC DRIVE SYSTEM

[75] Inventor: John L. Grimsley, Los Altos, Calif.

[73] Assignee: Oak Technology, Inc., Sunnyvale, Calif.

[21] Appl. No.: 08/834,607

[22] Filed: Apr. 14, 1997

[51] Int. Cl.[7] .................................................. G11B 7/00
[52] U.S. Cl. .................................. 369/44.32; 369/44.27; 369/43; 360/75
[58] Field of Search ........................... 369/44.32, 44.34, 369/44.35, 44.27, 44.28, 43, 47, 48, 50, 58, 59, 60, 124, 32; 360/77.04, 77.02, 77.01, 75

[56] References Cited

U.S. PATENT DOCUMENTS

| | | | |
|---|---|---|---|
| 3,881,184 | 4/1975 | Koepcke et al. | 360/78 |
| 4,135,217 | 1/1979 | Jacques et al. | 360/77 |
| 4,136,365 | 1/1979 | Chick et al. | 360/78 |
| 4,149,199 | 4/1979 | Chick et al. | 360/77 |
| 4,205,338 | 5/1980 | Schaefer | 358/28.5 |
| 4,371,960 | 2/1983 | Kroiss | 369/43 |
| 4,536,809 | 8/1985 | Sidman | 360/77 |
| 4,594,622 | 6/1986 | Wallis | 360/77 |
| 4,616,276 | 10/1986 | Workman | 360/77 |
| 4,628,379 | 12/1986 | Andrews, Jr. et al. | 360/77 |
| 4,745,588 | 5/1988 | Yoshikawa et al. | 369/32 |
| 4,755,977 | 7/1988 | Abed | 369/32 |
| 4,764,914 | 8/1988 | Estes et al. | 369/58 |
| 4,982,297 | 1/1991 | Tsujisawa | 360/77.04 |
| 5,051,851 | 9/1991 | Sakurai | 360/77.06 |
| 5,072,318 | 12/1991 | Yu | 360/77.02 |
| 5,121,374 | 6/1992 | Barton et al. | 369/44.29 |
| 5,187,620 | 2/1993 | Notake et al. | 360/77.04 |
| 5,241,433 | 8/1993 | Anderson et al. | 360/77.04 |
| 5,402,280 | 3/1995 | Supino | 360/77.04 |
| 5,404,253 | 4/1995 | Painter | 360/77.04 |
| 5,539,714 | 7/1996 | Andrews, Jr. et al. | 369/44.26 |
| 5,550,685 | 8/1996 | Drouin | 360/77.08 |
| 5,559,768 | 9/1996 | Ito et al. | 369/44.25 |

FOREIGN PATENT DOCUMENTS

| | | |
|---|---|---|
| 0227044 | 7/1987 | European Pat. Off. . |

*Primary Examiner*—Muhammad N. Edun
*Attorney, Agent, or Firm*—Townsend and Townsend and Crew LLP

[57] ABSTRACT

The invention provides methods and apparatus for compensating for disc runout. In an exemplary embodiment, a data-storage device is provided which includes a rotatable disc and a data head for accessing the disc. The device includes a runout calibration system comprising positioning mechanics coupled to the head for moving the head relative to the disc. A servo loop incorporates the positioning mechanics and generates a drive signal used to control the positioning mechanics. A memory, having an input and an output coupled to the loop, is also provided for recording a plurality of samples of the drive signal. The memory then plays back those samples into the feedback loop at first periodic angular increments forming a calibrating drive signal.

20 Claims, 18 Drawing Sheets

| | |
|---|---|
| FG | Frequency Generator -- angular pulses from disc motor rotation |
| XD | Disc Track Position Input -- runout (near-sinusoidal) plus spiral |
| XT | Track Position Output -- optical pickup lens actuator, relative-to-sled |
| XS | Sled Position Output -- feedmotor, sled, and couplings, absolute |
| XE | Disc-to-Track Lens Position Error (XE = XD-(XT+XS)) |
| TE | Track Error -- servo controller input to A/D converter, voltage |
| TX | Track Error Crossing -- servo controller input, logic |
| RX | Ripple Crossing -- servo controller quadrature input, logic |
| TRK | Track Search Length -- Fine Search, from micro-processor |
| B_F | Track Search Direction -- Backward/Forward, from micro-processor |
| TKIC | Track Kick Signal -- Fine Search, digital |
| SKIC | Sled Kick Signal -- Fine Search, digital |
| TOUT | Track Equalizer Out -- signed digital |
| SOUT | Sled Equalizer Out -- signed digital |
| ROC | Runout Calibration -- signed digital |
| TRO | Track Output -- servo controller output from D/A converter, voltage |
| SLO | Sled Output -- servo controller output from PWM converter, voltage |
| VTA | Track Actuator Voltage -- driver amp output, differential |
| VSM | Sled Motor Voltage -- driver amp output, differential |

FIG. 3B

Track Servo during Normal Play Simulation
CD-ROM — Servo FPGA
16x Drive with Disc Eccentricity Horizontal Track Runout : Frequency = 133 Hz : Amplitude = +/- 180 μm

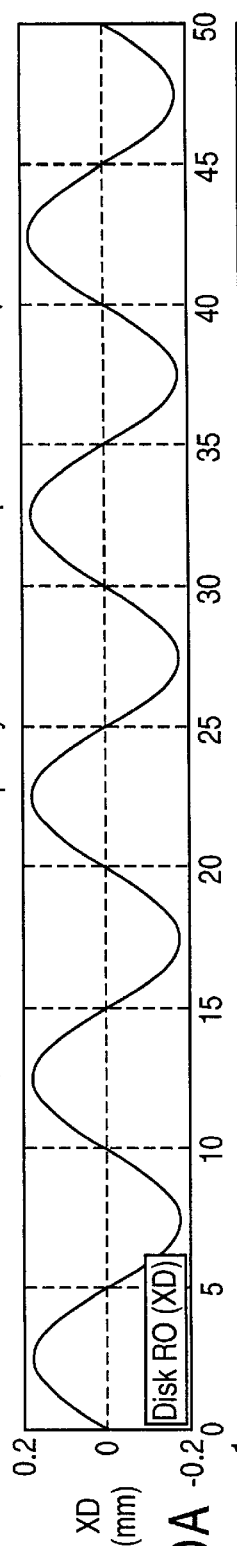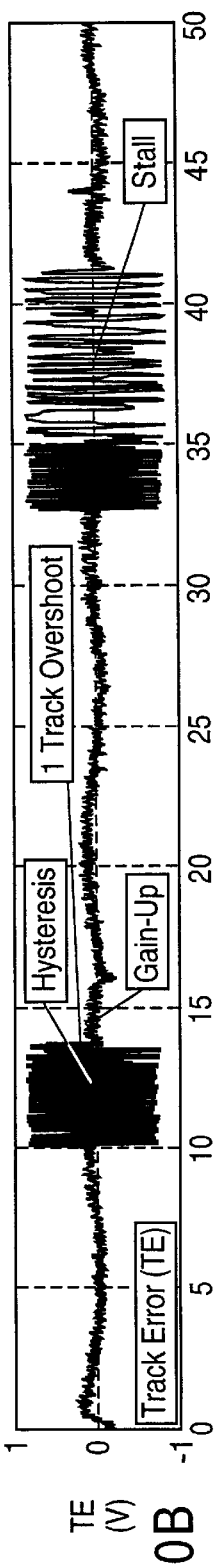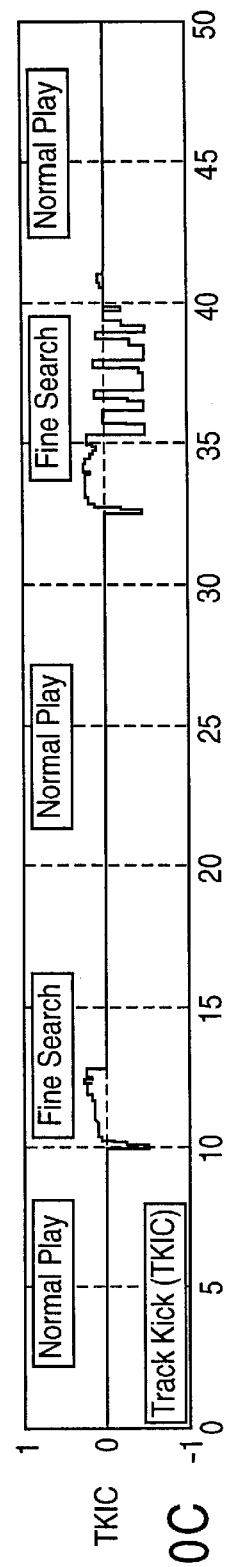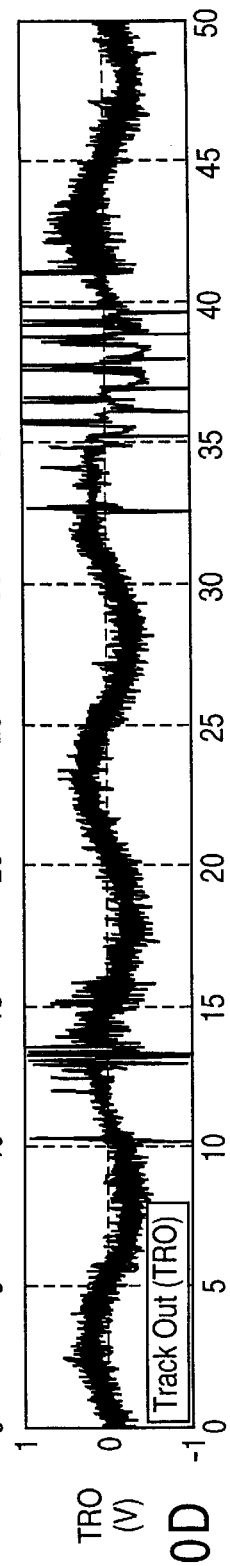
FIG. 10A, FIG. 10B, FIG. 10C, FIG. 10D — 12x CD-ROM Drive without Runout Calibration. Servo Chip Simulation. 32 Track Fine Searches @ 6000 RPM. Horizontal Track Runout: Frequency = 100 Hz; Amplitude = +/- 180 μm.

16x CD-ROM Drive without Runout Calibration
Servo Chip Simulation
32 Track Fine Search @ 8000 RPM
Horizontal Track Runout : Frequency = 133 Hz : Amplitude = +/- 180 μm

RUNOUT CALIBRATION FOR DISC DRIVE SYSTEM

BACKGROUND OF THE INVENTION

The present invention relates generally to the field of data storage devices, and in particular to runout calibration for data storage devices using a rotatable disc.

Rotatable discs (or disks), as the term is used herein, include hard discs, high-capacity floppies and optical discs—including read only compact discs (CD) and digital versatile discs (DVD), as well as their writable counterparts (e.g., CD-R, CD-RW and DVD-RAM). In data storage devices employing rotatable discs (e.g., "disc drive systems"), information is read from and/or written to such a disc (while it is rotating) by a transducing data head supported adjacent the disc surface. The data head type is determined by the subject disc technology; e.g., it may be electromagnetic to access magnetic discs, optical to access CDs and DVDs, etc.

Rotatable discs (or "disks") store data in tracks. For example, magnetic discs store data in a series of concentric tracks while CDs store data in a single, spiral track (like a phonograph record) that circumnavigates the disc thousands of times (e.g., over 20,000) as it gradually moves away from the center. For ease of discussion, each rotation of the spiral track is referred to herein as a track.

A conventional disc drive system typically includes a positioning servo loop or, more generally, a servo system (containing one or more servo loops) to position and maintain the data head precisely over a selected track of the disc. The operation of maintaining the head over a desired track (i.e., normal play) is known as "track following" and that of moving the data head between tracks is known as track "accessing," "searching" or "seeking." The ability of a data head to stay locked on a single track is complicated by the large number of tracks and the high speed at which the discs rotate. Staying locked on a single track is further complicated by any irregularities in the track shape.

Many discs have some type of irregularity which causes a track's center to be offset from a disc's axis of rotation (disc "eccentricity"). This can be caused by a number of factors, including irregularities in a disc's manufacture. This eccentricity results in "disc runout." Disc runout is the lateral displacement of a track which, as the underlying disc rotates, appears sinusoidal from the vantage point of a data head. Conventional servo systems performing track-following operations attempt to compensate for this phenomenon.

FIG. 1 illustrates a conventional servo loop 10 for use in a disc drive system, which includes a servo controller 14 coupled to drive mechanics 18 (e.g., servo(s) used to position a data head) via an amp 16 and a feedback loop 19. Signals associated with a track follow operation are also included in this figure. "XI" is a physical position input, which includes a near-sinusoidal component representing disc runout. "XO" is a physical position output, which represents the dynamic position of a data head relative to a rotatable disc.

In the presence of disc runout, XI may represent the movement of many tracks near-sinusoidally at the disc rotational frequency. The position output, XO, must follow this multi-track input within a fraction of the track pitch to avoid excessive position error and thus data errors. In an attempt to accomplish this track follow requirement, a summing junction 12 compares position input XI and position output XO to produce a physical position error XE. Position error XE must be less than some prescribed value over the entire time of one full disc revolution to achieve accurate track follow during data read/write operations.

The position error XE is processed and fed into a servo controller 14, which produces a controller output drive signal XC, which typically approximates the acceleration of the drive mechanics. Controller output XC is in turn passed through an amplifier 16 and fed into drive mechanics 18 as signal XOdd to drive the mechanics of the servo loop.

Ideally, drive signal XC should correct any positional error of the data head. However, as disc rotational speeds increase and track spacings get smaller in the presence of large runout, it becomes more difficult for a conventional analog or digital servo controller to maintain acceptably small position errors (XE) during all conditions, particularly following a track searching operation. This is due, in part, to the fact that there is a limit to the responsiveness of such servo systems if instabilities at certain resonant frequencies are to be avoided. Moreover, position loop bandwidth limitations in conventional servo systems also affect responsiveness, especially where the disc runout can reach or exceed several hundred tracks.

In other words, where significant eccentricity exists, conventional servo systems can have difficulty following certain deviations of the tracks during a track following operation resulting in reading and/or writing errors. This problem increases as the number of tracks on a disc increase and/or the rotational speed of the disc increases in the presence of large runout.

Like track following, track searching is also detrimentally affected by disc runout. In a track search, drive mechanics of the servo system try to move a data head quickly and reliably to any desired track in order to begin data operations. This operation may be broken down into two steps: (1) high-speed search and (2) low-speed settling. In a high-speed search, the servo system tries to accelerate a data head to a very high velocity to minimize search time. Feedback typically comes from the relative velocity between the motion of the head and the oscillating tracks (due to runout). There may be a finite limit to the magnitude of the relative velocity which can be reliably measured. If the runout is sufficiently severe, this limit may be exceeded resulting in search failure.

Low-speed settling means grabbing onto a track (hopefully the target track) using the position servo system and centering the data head quickly. With a large disc runout, the relative speed of the oscillating tracks may be many times larger than a desired "safe" locking speed (which the servo system is trying to maintain as it attempts to converge on the target). Settling problems may include (a) overshoot within the target track which would increase time-to-data, (b) skipping one or more tracks away from the target—requiring a re-search, or (c) skidding forever and timing out or possibly requiring a drive reset.

Therefore, it would be desirable to provide a method and system for accurately and reliably compensating for disc runout. It would be further desirable to compensate for disc runout during both track following and track searching operations.

In one aspect, it would be desirable to provide such compensation while minimizing signal noise, thereby enhancing the accuracy of the system.

SUMMARY OF THE INVENTION

The invention provides methods and apparatus for compensating for disc runout. In an exemplary embodiment, a data-storage device is provided which includes a rotatable disc and a data head for accessing the disc. The device includes a runout calibration system comprising positioning mechanics coupled to the head for moving the head relative to the disc. A servo loop incorporates the positioning mechanics and generates a first drive signal used to control the positioning mechanics. A memory, having an input and an output coupled to the loop, is also provided for recording a plurality of samples of the first drive signal. The memory then plays back those samples into the feedback loop at first periodic angular increments.

In one aspect, a frequency generator is coupled to the memory for defining the first periodic angular increments. In a further aspect, a prefilter is coupled to the memory input wherein the memory contains filtered but otherwise unaltered samples of the first drive signal. Still another aspect involves coupling a gain-adjustment circuit to the output of the memory.

In one aspect of the invention, the runout calibration system further includes a first summing junction disposed within the feedback loop. The first summing junction sequentially sums one of a plurality of samples with a then-current drive signal over a plurality of second periodic angular increments. The second periodic angular increments are approximately equal to the angular distance of one rotation of the rotatable disc.

In a still further aspect, the runout calibration system further comprises a second summing junction disposed upstream of the first summing junction within the feedback loop. The second summing junction produces a positional error of the data head relative to the rotatable disc. This error is a precursor to the then-current drive signal.

In another embodiment a system is provided comprising a rotatable disc containing data, a data head disposed proximate to the rotatable disc, and positioning mechanics coupled to the head for moving the head relative to the disc. The system includes a first servo loop for generating a first track-following signal operable to control the positioning mechanics, and a second servo loop to generate a track-searching signal operable to control the positioning mechanics. A memory is also provided, having an input and an output coupled to the first and second loops for recording a plurality of samples of the first track-following signal and playing back those samples into the first and second loops at select periodic angular increments.

In one aspect of the servo system, the samples are played back into the first loop when the positioning mechanics are engaged in a track-following operation. In another aspect, the samples are played back into the second loop when the positioning mechanics are engaged in a track-searching operation.

In a further aspect, the servo system also includes a bandpass filter coupled to the input of the memory and a gain-adjustment circuit coupled to the output of the memory. In another aspect, the servo system includes a digital-to-analog converter for converting the first track-following signal, and an amplifier for amplifying the first track-following signal having an input and an output. The amplifier input is coupled to the D/A converter and the amplifier output is coupled to the positioning mechanics which respond to the first track-following signal by positioning the data head.

In a still further aspect, the servo system further comprises a frequency generator for defining periodic angular increments.

BRIEF DESCRIPTION OF THE DRAWINGS

FIG. 3B is a table of terms used in FIG. 3A.

FIGS. 10A–10D are charts representing performance simulation of a 12× CD-ROM drive system without runout calibration during normal play and fine search.

DETAILED DESCRIPTION OF THE SPECIFIC EMBODIMENTS

Figure 1:
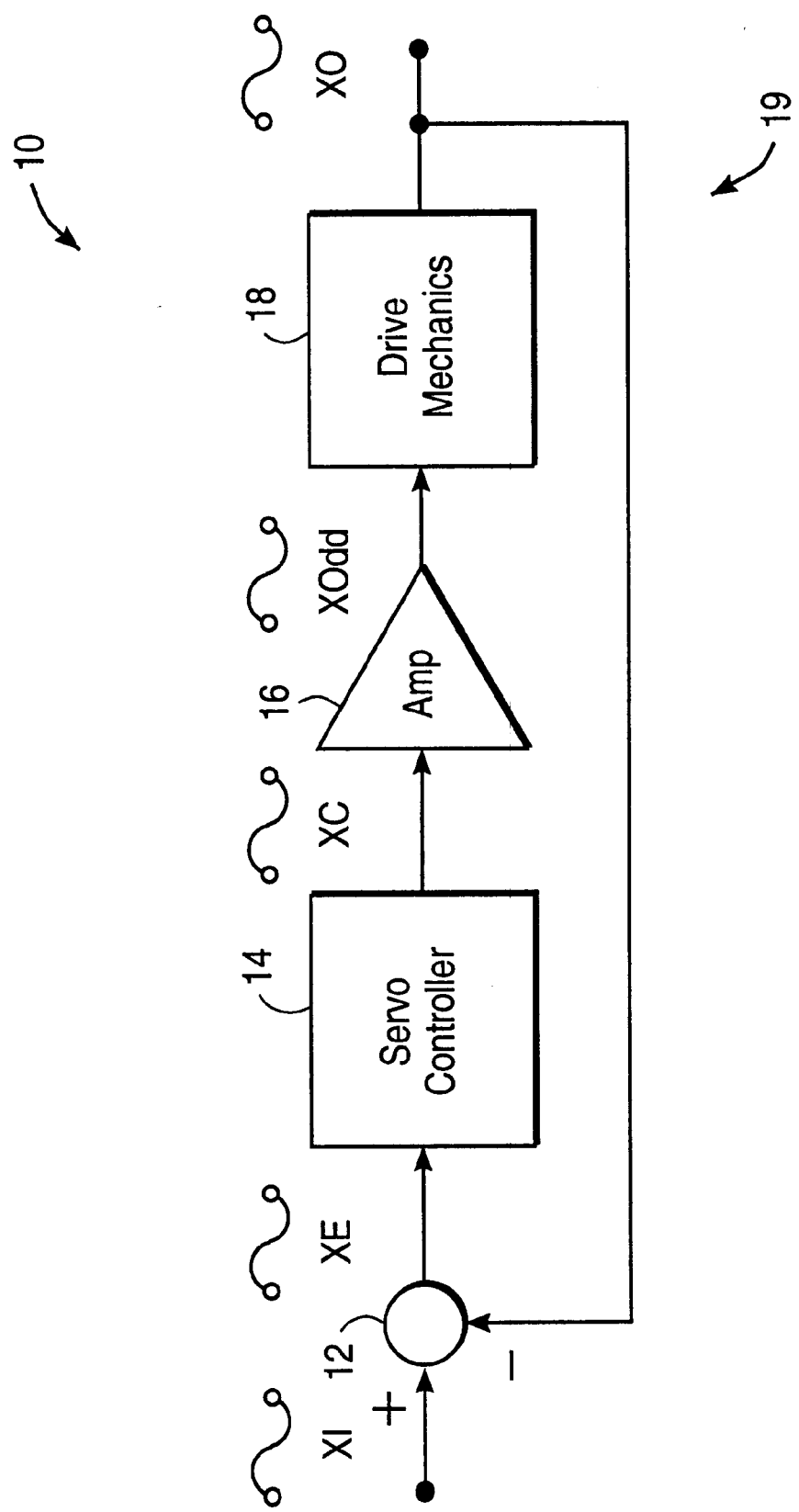
FIG. 1 is a block diagram of a basic servo loop representing the typical prior art.
Figure 2:
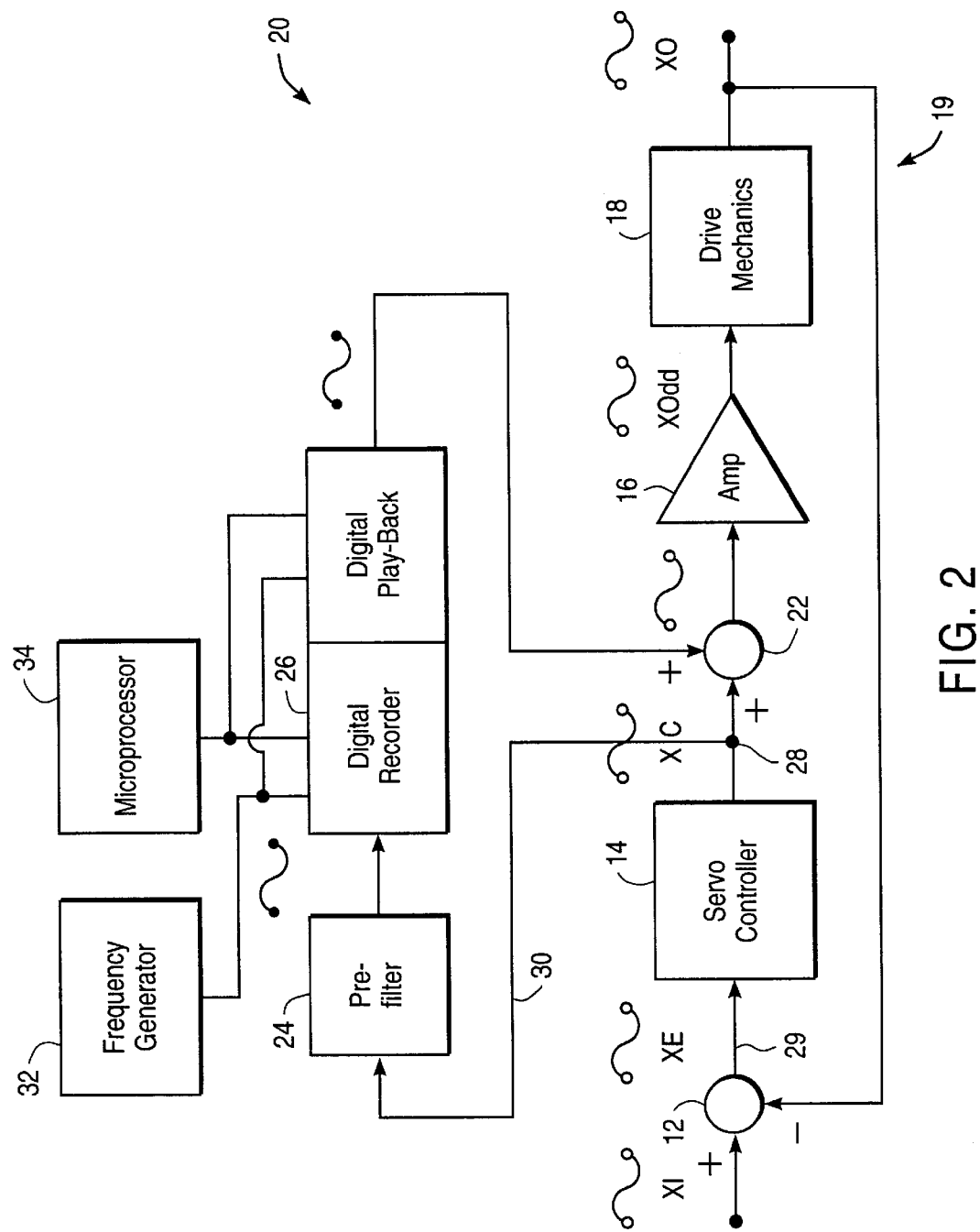
FIG. 2 is a block diagram of a first embodiment of the invention.

FIG. 2 illustrates servo loop 10 of FIG. 1 modified to incorporate runout calibration in accordance with the present invention. More specifically, servo loop 20 of FIG. 2 incorporates summing junction 22, and is coupled to prefilter 24, digital recorder/playback component 26 and associated control components 32 and 34. Prefilter 24 is coupled to the output of servo controller 14 and input of recorder/playback component 26. Component 26, in turn, is coupled to loop 10 through summing junction 22. A frequency generator 32 and microprocessor 34 are also coupled to component 26 for control purposes.

As described in connection with FIG. 1, XI represents a physical position input of a rotating disc, XO represents a physical position output of a data head relative to the disc and XE represents a calculated physical position error for the head with respect to a track on the disc. As is well known by those skilled in the art, such position error is fed into servo controller 14, the resulting drive signal (XC) approximating the acceleration of drive mechanics 18 is amplified by amplifier 16 and input into drive mechanics 18 in an attempt to follow the subject track.

However, in accordance with the invention, controller output (drive signal XC) is also selectively sampled (i.e., tapped from node 28 and filtered by prefilter 24) and digitally recorded at fixed angles of disc rotation by recorder/playback component 26 and ultimately played back at these same fixed angles by component 26. These samples function as runout "calibration drive signals"—selectively augmenting drive signal XC so to compensate for disc runout throughout disc rotation. Such "runout calibration" can facilitate more accurate track following operations (as well as track searching operations, as described below in connection with FIG. 3A).

If the output of the controller is sampled about every 10 degrees of disc rotation, then 36 digital samples are accumulated over one 360 degree rotation. During playback, each sample is continuously output until the next sample is selected (i.e., in this example each sample is continuously output for the time it takes to rotate the disc 10 degrees).

As an alternative embodiment, signal XC may be replaced with a signal representing XE for sampling, recording and play back with an appropriate scaling constant (to compensate for differences in units) between XE and the prefilter.

Depending on the application, different types of prefilters 24 may be applied to gather these samples. If a single sinusoidal frequency dominates, then a band-pass filter at the disc rotation frequency would suffice. The band-pass filter would eliminate noise, harmonics, phase-distortion, and steady-state offset. Once servo loop 10 reaches steady-state, all data could be recorded in a single revolution.

Alternatively, prefilter 24 could be a point-by-point average of the same 36 points over several revolutions to obtain samples if a recording over a single-revolution was undesirable.

The samples of signal XC are recorded and played back by component 26. In a preferred embodiment, this component is a digital read/write memory (i.e., RAM, DRAM, SRAM, etc.) controlled by microprocessor 34 (e.g., to select and control record and playback functions) and frequency generator 32 (for providing a sampling frequency). As would be understood by one skilled in the art, component 26 may be constructed from any device capable of recording and playing back sampled signals as described herein.

Referring to FIG. 2, sampled signals are played back by component 26 at the same fixed angles at which they were recorded, and summed at summing junction 22 with a then-current XC signal output from servo controller 14. The played back sample from component 26 is related to acceleration of drive mechanics 18. It is this summed signal which is amplified by amplifier 16 and may be used to control drive mechanics 18 in track following operations as well as track searching operations (as discussed below in connection with FIG. 3A).

In hard disc drive systems, sufficient friction exists in the drive mechanics so that input and output signals of servo controller 14 may be distorted from pure sine waves. For high-capacity, track following floppy drives, the shape of the elastomeric discs themselves can become noncircular due to temperature and humidity. Both applications might call for higher-order harmonics of disc rotation to be included in the digital recording of the servo controller output (or input in the alternative embodiment mentioned above).

Figure 3A:
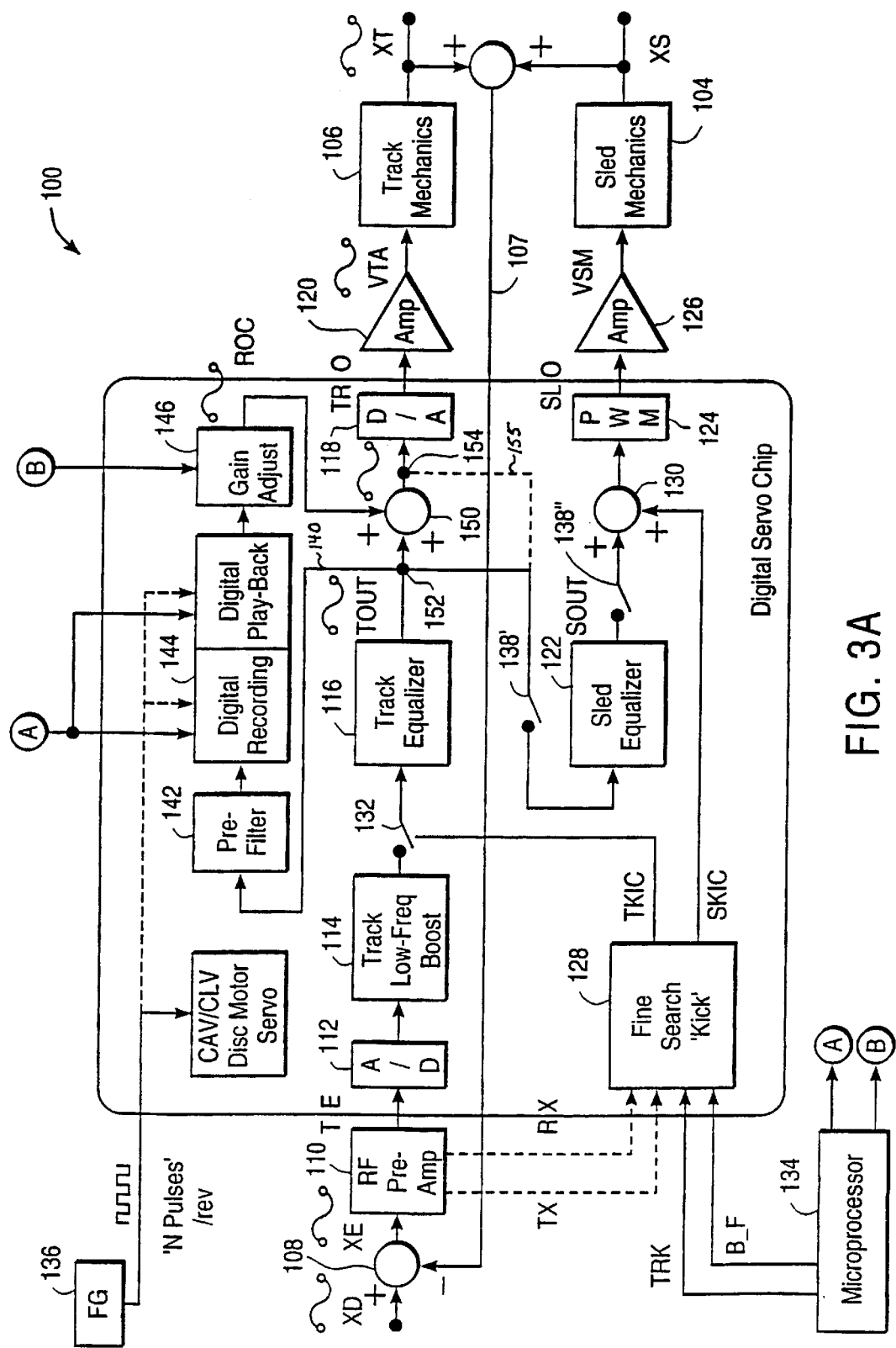
FIG. 3A is a block diagram of a second embodiment of the invention.
Figure 3C:
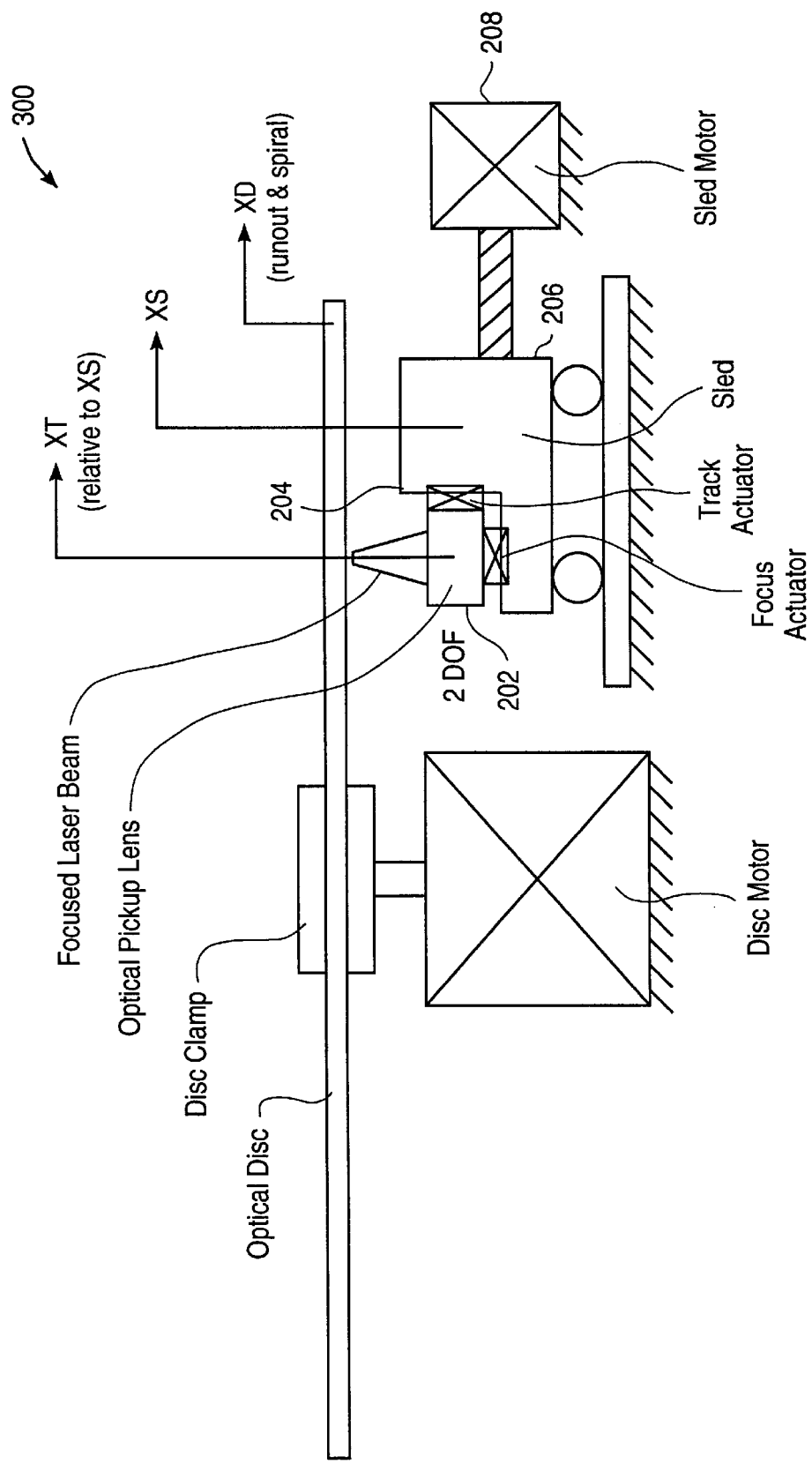
FIG. 3C is a diagram of exemplary CD-ROM disc drive mechanics.
Figure 4:
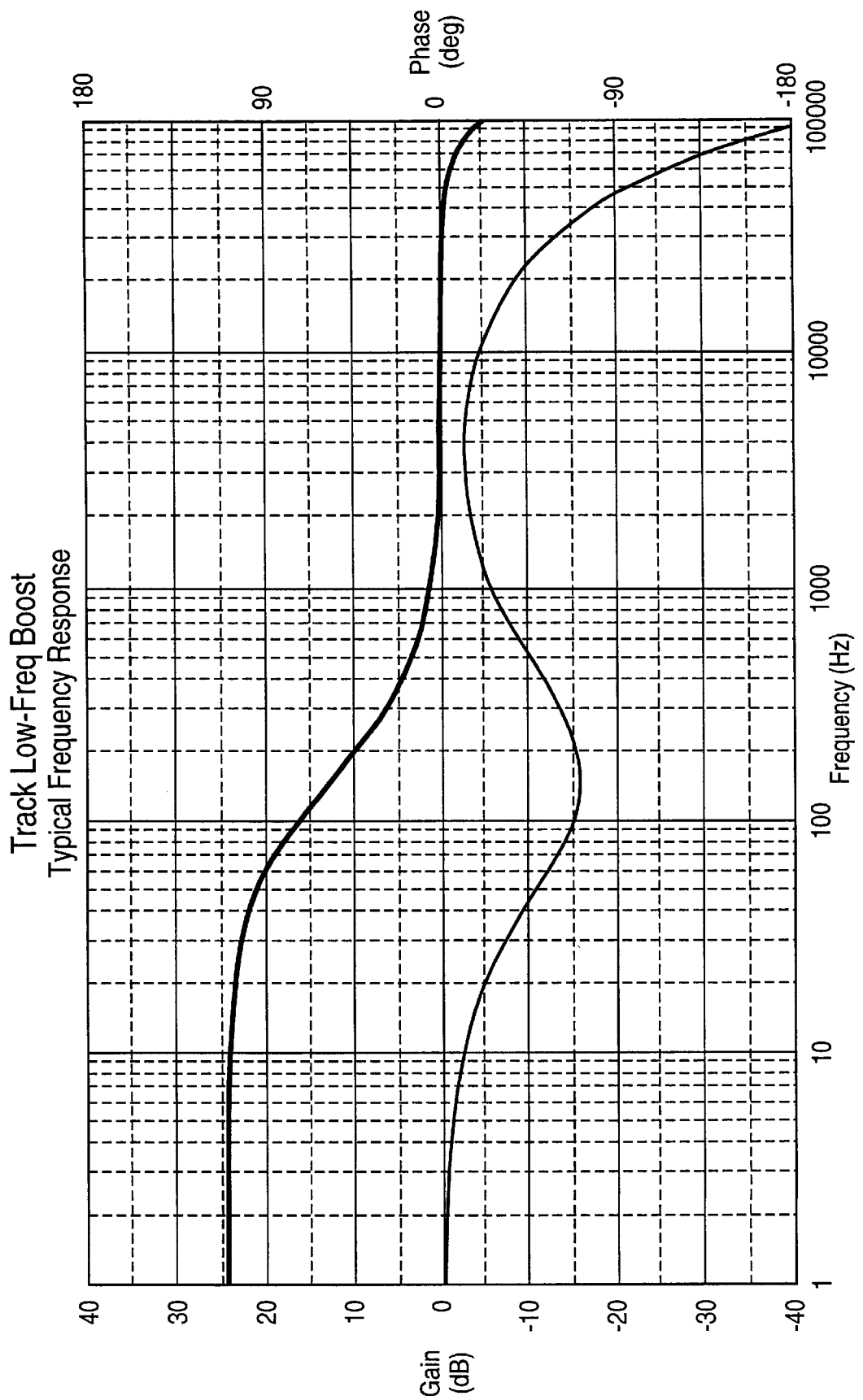
FIG. 4 is a typical frequency response plot for a track low-frequency boost circuit as used in the system of FIG. 3A.

Turning now to FIGS. 3A and 3B, a second and preferred embodiment of the present invention is described. FIG. 3A is a schematic block diagram of a servo system 100 which receives input from a CD-ROM drive system to drive both track and sled mechanics (i.e., servos). FIG. 3B defines terms used in FIG. 3A. As is known in the art, track and sled mechanics may be used to control the movement of an optical data head (i.e., a pickup), which reads from and/or writes information to tracks on a CD-ROM surface. The sled moves relative to a base plate on which the disc rotates and the optical data head moves relative to the sled. The sled is capable of moving over the entire surface of a disc (e.g., more than 20,000 tracks). The optical data head, however, can only move approximately plus or minus 300 tracks relative to the sled's position. For this reason, the sled and optical data head work together to properly follow a particular track or to perform a fine search for a specific track. FIG. 3C shows exemplary, well-known disc drive mechanics 300 including track mechanics (e.g., optical pickup lens 202, track actuator 204) and sled mechanics (e.g. sled 206 and sled motor 208).

The following discussion in connection with FIG. 3A will address conventional track following operations using a set of track-following servo loops, conventional track searching operations using a set of track-searching servo loops, and a runout calibration feature according to the present invention which generates a calibrating drive signal that is applied to both track following and track searching operations.

In FIG. 3A, XD represents the physical motion of a track on a rotating CD-ROM disc. Any sinusoidal disc runout motion present (which may manifest itself in the movement of many tracks (e.g., ±112) near-sinusoidally at the disc rotational frequency) is combined with the disc spiral motion to create XD. If no runout exists, XD only constitutes the slow spiral motion of the track. The absolute motion of an optical data head is represented by the sum of XS and XT. XS represents the position of sled mechanics 104 and XT represents the position of track mechanics 106 relative to the sled. As previously noted, this XT motion is limited to approximately plus or minus 300 tracks. The optical data head is moved further by sled mechanics. The sled can move over the full range of tracks on a typical CD, while the track mechanics move the optical data head up to approximately plus or minus 300 tracks relative to the sled. A combination of XS and XT are used to move the optical data head for track following. Since a CD-ROM disc typically contains over 20,000 tracks, sled movement is necessary to allow continuous tracking over the entire CD-ROM disc surfaces.

A summing junction 108 produces an error measurement XE by comparing the track position XD with the optical data head position, XT and XS which are fed back to junction 108 via feedback loop 107. Error measurement XE is passed through radio frequency (RF) pre-amplifier 110, which produces a voltage TE representative of the error between the head position and the track position. Conversion of XE to TE is a conventional operation typical of many CD-ROM drives, and well known to those skilled in the art. For example, TE may be generated through the use of side beam photodiodes placed in the optical data head (i.e., pickup) of a CD-ROM drive, as described in C. Sherman, *CD-ROM Handbook*, Intertext Publications McGraw-Hill, Inc. (1994), which is hereby incorporated by reference in its entirety for all purposes. During track following operations, TE is proportional to XE.

Figure 5:
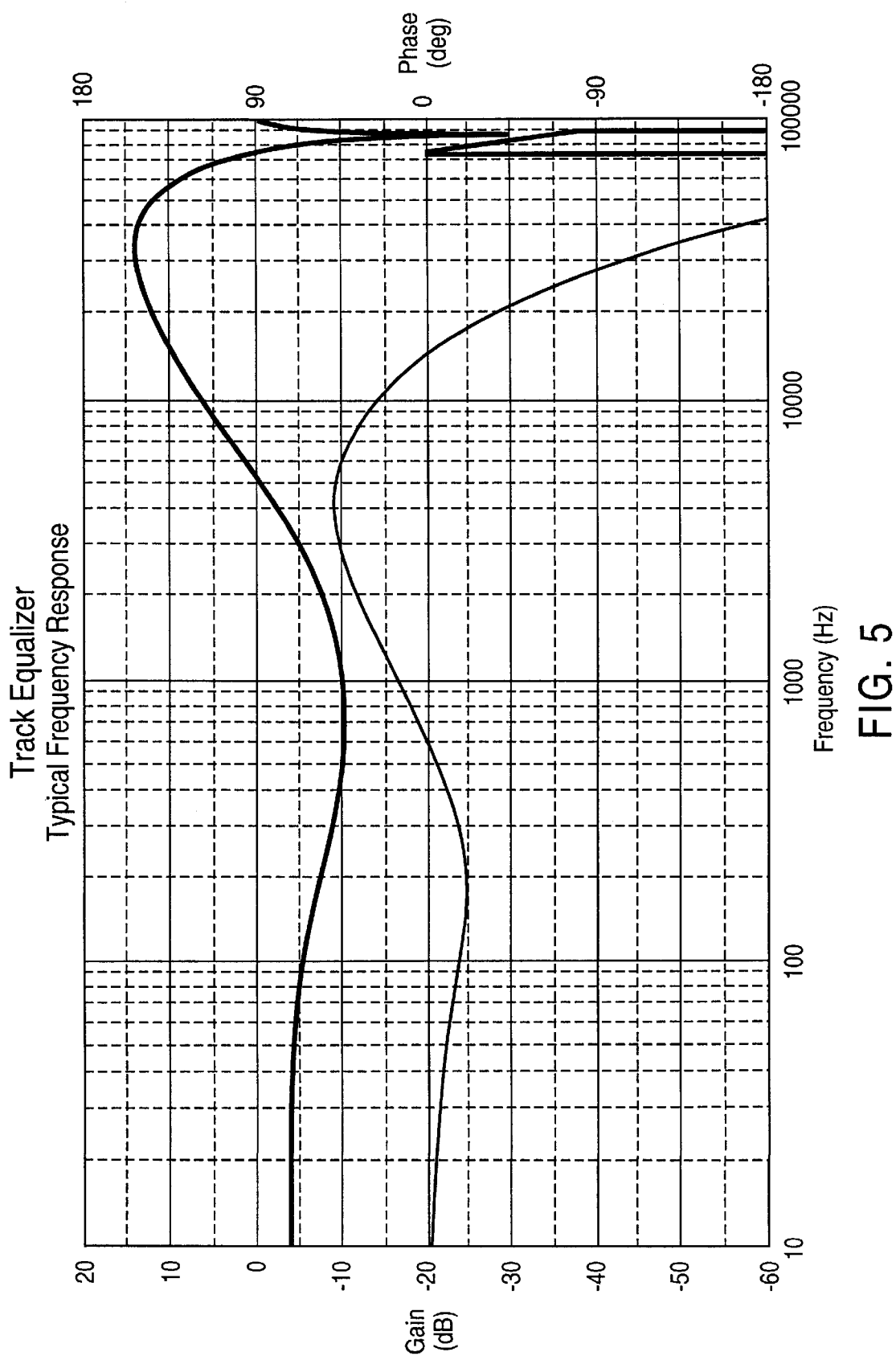
FIG. 5 is a typical frequency response plot for a track equalizer as used in the system of FIG. 3A.

During normal track following, i.e. normal play/record, the TE signal will be generated and processed within a set of track-following servo loops, which in this embodiment includes elements 106–120 (a track loop) and elements 104, 108–116 and 122–126 (a sled loop). The analog TE signal is converted into a digital signal by analog-to-digital converter 112. The converted signal then enters a track low-frequency boost component 114, which applies a very high gain at a relative low frequency (i.e., the dominant frequency of the disc runout). The result is a signal with enhanced low frequency elements. As an example, disc runout frequency experienced by 12× speed CD-ROM drives may be about 100 Hz while that of 16× drives may be about 133 Hz. FIG. 5 depicts a typical frequency response for low-frequency boost 114, which may be readily configured in analog or digital circuitry by those skilled in the art.

The output of low-frequency boost 114 is subsequently processed by track equalizer 116, a conventional element which provides stability to the closed loop servo system of FIG. 3A, as is well known in the art. FIG. 5 depicts a typical frequency response of track equalizer 116, which may be readily configured in analog or digital circuitry by those skilled in the art. The output from track equalizer 116 is drive signal TOUT which approximates the acceleration of track mechanics 106.

Signal TOUT proceeds through a digital to analog (D/A) converter 118 and an amplifier 120, producing an amplified analog signal VTA that is used to drive track mechanics 106. As will be discussed below, TOUT for an embodiment of the present invention is also used to generate a calibrating drive signal.

Figure 6:
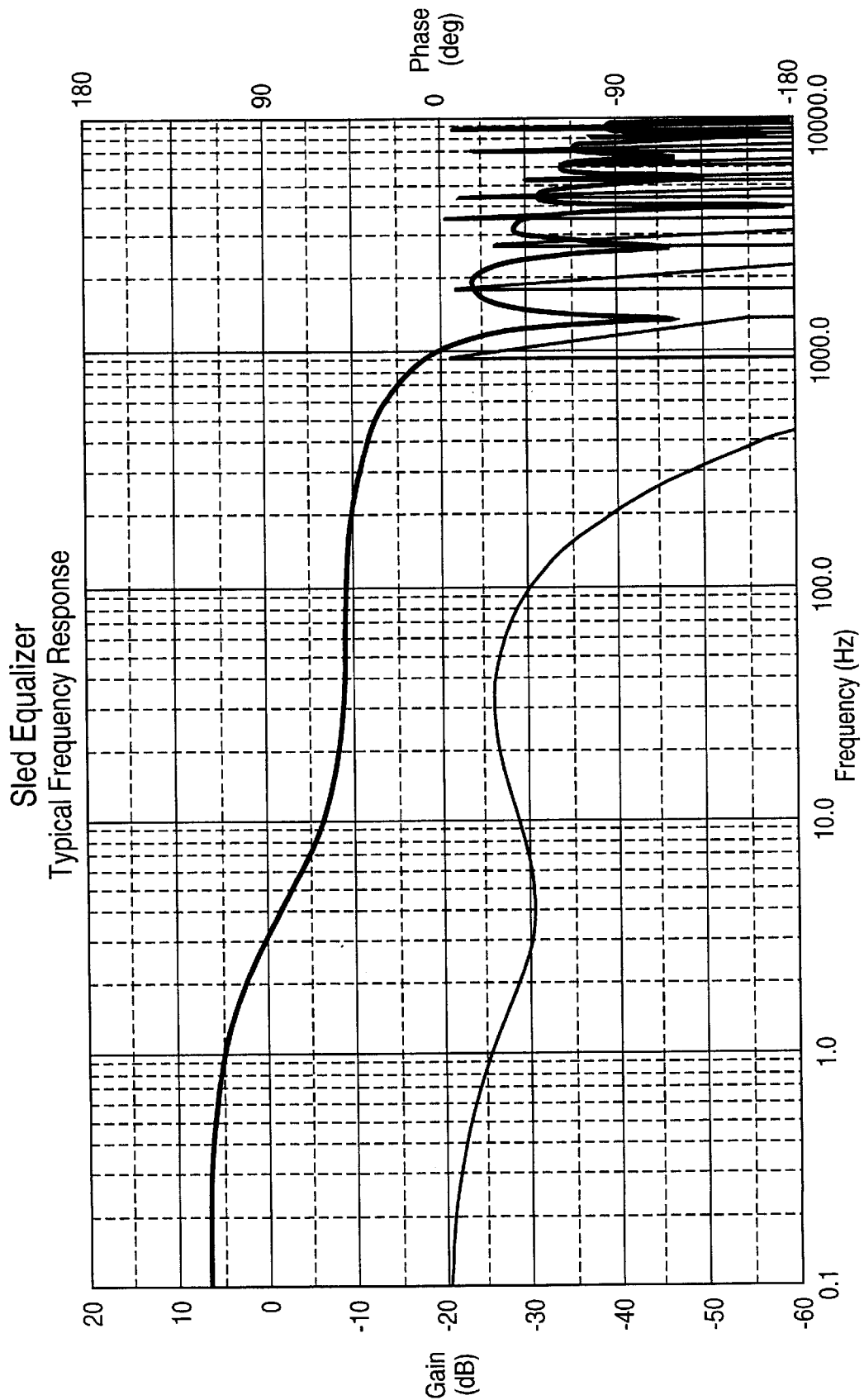
FIG. 6 is a typical frequency response plot for a sled equalizer as used in the system of FIG. 3A.

During track following operations, either with or without a calibrating drive signal, the TOUT signal is also processed by a sled equalizer 122 to assist with the coordination of sled and corresponding optical data head movement via sled mechanics 104. Referring to FIG. 3A, processor 134 always closes switches 138' and 138" during track following. As already noted, track following requires a coordinated movement of both the sled and the optical data head relative to the sled. The TOUT signal is processed by sled equalizer 122, a conventional element which provides stability to the closed loop servo system of FIG. 3A, as is well known in the art. FIG. 6 depicts a typical frequency response of sled equalizer 122, which may be readily configured in analog or digital circuitry by those skilled in the art.

Referring again to FIG. 3A, the digital output of equalizer 122 (SOUT) passes through summing junction 130 unchanged since the second input of the junction (SKIC) is zero during track following operations Accordingly, SOUT is independently converted to an analog signal by pulse-width-modulating (PWM) D/A converter 124, producing a sled output SLO. SLO is a voltage representing the sled controller output. SLO passes through amplifier 126, to produce a sled motor voltage that drives sled mechanics 104 thereby producing sled position output XS.

Together, XS and XT represent the movement of the optical data head as it follows a particular track. These values are returned by feed back loop 107 to summing junction 108, which produces position error XE.

Continuing with FIG. 3A, a track searching operation and associated components will now be described. As in the foregoing discussion, a position error XE is determined from relative positions XD, XS and XT, and processed by RF Pre-Amplifier 110. Track searching, however, also utilizes so-called RX and TX signals resulting from amplifier 110 operation to monitor track crossing and search direction (i.e., forward or backward). During normal track searching, the TE signal is used to generate TX (described below) and thereafter processing continues within a set of track-searching servo loops, which in this embodiment includes elements 106–110, 128, 116–120 (a track loop) and elements 104, 108–110, 128, 122–126, 130 (a sled loop). As an alternative embodiment, this track-searching sled loop may also include elements 116 and 122.

Signals TX and RX are derived from the well known diode configuration in an optical data head. A typical array for this pickup includes six diodes; four clustered together at the center and two staggered diagonally on the periphery. The center group is summed by amplifier 110 to produce an analog signal called "RF Ripple" or RFRP. For the periphery diodes, the difference between the two generates the analog signal TE. In a standard three-beam pickup, the main beam hits the four center diodes. The two sidebeams, each slightly off track, hit the two staggered diodes.

During a search, when the pickup arm is crossing tracks by moving along the radius of the disc, the sinewaves RFRP and TE are 90 degrees out of phase from each other. (These sinewaves oscillate one cycle for each track crossed.) For processing, RFRP is thresholded by a comparator (not shown) to produce square wave RX while TE is thresholded to produce square wave TX. Each complete cycle of RX or TX represents the crossing of a track. The phase of RX in view of TX (i.e., either 90 degrees ahead or behind) indicates direction of the search. TX and RX generation is further discussed in a commonly-owned, co-pending provisional patent application, Ser. No. 60/043,495 Apr. 11, 1997, and entitled "Proportional Sampling Circuit For Auto-Adjustment of CD-ROM Pickup Signals," which is hereby incorporated by reference in its entirety for all purposes.

Both TX and RX are input into Fine Search Kick block 128, which is conventional logic designed to coordinate the movement of an optical data head in a fine track search through the use of sled and track mechanics. (In accordance with this embodiment, a fine search may range from one to a few thousand tracks while a rough search may range from a few thousand to over twenty thousand tracks.)

At the start of a search, microprocessor 134 provides data signals TRK and B_F, which indicate the number of tracks the fine search will cover and the direction of the search, respectively For example, if the system were used with an audio CD, the TRK input would indicate that the track and sled mechanics should move to the beginning of another song located 200 tracks away and the B_F input would indicate whether that song was forwards or backwards from the present position. During operation, the value of TRK is decremented (or incremented) based on the number of tracks crossed and their direction as provided by signals TX and RX. When this value reaches zero, the search is complete.

Fine Search Kick block 128 produces two signals, a track kick (TKIC) and a sled kick (SKIC). The SKIC signal, after passing through the D/A converter 124 and amplifier 126, directs sled mechanics 104 to move a specified distance. The SKIC signal will be proportional to the number of tracks to be moved. The SKIC signal initially produces a sharp increase in sled velocity (i.e., acceleration), and then decelerates as the sled nears the target track.

The TKIC signal is passed through the track equalizer 116 via switch 132. (Switch 132, controlled by microprocessor 134, couples equalizer 116 to block 128 during track searching and to low-frequency boost 114 during track following.) In this track searching operation, equalizer 116 can be modified through the replacement of operating parameters (i.e., poles and zeros) to provide greater stabilization in search mode. A separate set of numbers may be loaded into equalizer 116 on the fly by microprocessor 134 to particularly accommodate the mode of operation (i.e., search numbers are loaded at the start of track searching and follow numbers are loaded at the start of track following). Such parameters for a specific servo loop may be readily determined by those skilled in the art. In an alternative embodiment, a second track equalizer may be added to the system to provide for dedicated track equalizers in track following and track searching operations and thereby eliminate the need to replace operating parameters on the fly. In yet another embodiment, a single equalizer 116 may be used with parameters that accommodate both searching and tracking operations.

TKIC is processed by equalizer 116 to become the current TOUT signal, which approximates the acceleration of track mechanics 106. In one embodiment, TOUT is not forwarded to equalizer 122 during track searching mode. This is represented by open switches 138' and 138". In an alternative embodiment, microprocessor 134 closes switches 138' and 138" during track searching mode thereby allowing TOUT to pass to equalizer 122.

In track searching mode, system 100 continues to process signals until a target track is found (or time-out occurs due to a failure to locate the target track).

Still referring to FIG. 3A, a preferred embodiment of the present invention involving runout calibration will be described. As noted above, track equalizer 116 produces a near-sinusoidal TOUT signal which drives track mechanics 106 and sled mechanics 104 (through switches 138' and 138"). Additionally, select samples of this signal are recorded and played back as calibrating drive signals. In accordance with the invention, samples of the sinusoidal TOUT signal, which approximates an acceleration signal, are extracted and recorded as cleanly as possible. These same samples are then periodically played back as calibration drive signals and added to a then-current TOUT signal for every normal track following operation and for every fine search operation to compensate for runout experienced with a particular disc. Such runout calibration can facilitate more accurate track following and track searching operations. Moreover, since the same sampled signal is recorded and played back without the need for noisy signal processing (such as double differentiation), the calibrating drive signals are produced with less noise than other runout calibration methods.

During track following, the output of equalizer 116 drives track mechanics 106 as well as sled mechanics 104 in a master/slave relationship. For a disc with large eccentric disc runout which could exceed several hundred tracks, it is preferred to drive only track mechanics 106 with a TOUT signal augmented with calibration drive signals and not the sled mechanics due to noise and wear of the latter. Accordingly, as shown in FIG. 3A, calibration drive signals are added downstream (i.e., at summing junction 150) of the pick-off point for the servo input to the sled (i.e., node 152). However, it is recognized that such pick-off point may be moved downstream of junction 150 (i.e., to node 154; as represented by dotted line 155) if such concerns become secondary to improved performance.

During track searching, it is desirable to maintain the near sinusoidal motion of the track mechanics 106 as much as possible. This makes the search more reliable and eases the smooth transition to normal play (track following) at the end of a fine search. Thus, as noted above, calibration drive signals (i.e., recorded samples) are continuously added to a then-current TOUT signal for every fine search operation to compensate for runout experienced with a particular disc.

Referring again to FIG. 3A, a preferred embodiment of the present invention includes prefilter 142 coupled to playback/recorder 144 which is, in turn, coupled to gain adjust circuit 146. Prefilter 142 is coupled to the output of equalizer 116 at node 152. Samples of TOUT are selectively sampled (i.e., tapped from node 152), cleansed by filter 142 and recorded at fixed angles of disc rotation (i.e., periodic angular increments) by recorder/playback component 144. These same samples are subsequently played back at the same fixed angles by component 144 and adjusted for gain by gain adjust circuit 146 (as described below) before being output to summing junction 150. At this junction, the current output of equalizer 116 (i.e., the then-current TOUT) is combined with a recorded sample as output by circuit 146.

As an alternative embodiment, line 140 coupled to prefilter input 142 may be moved from node 152 to node 154.

As noted above with respect to FIG. 2, the number of samples recorded at fixed angles of disc rotation may vary. In the preferred embodiment of FIG. 3, TOUT is sampled approximately every 10 degrees of disc rotation, resulting in about 36 digital samples. During playback, each sample is continuously output until the next sample is selected.

Figure 7:
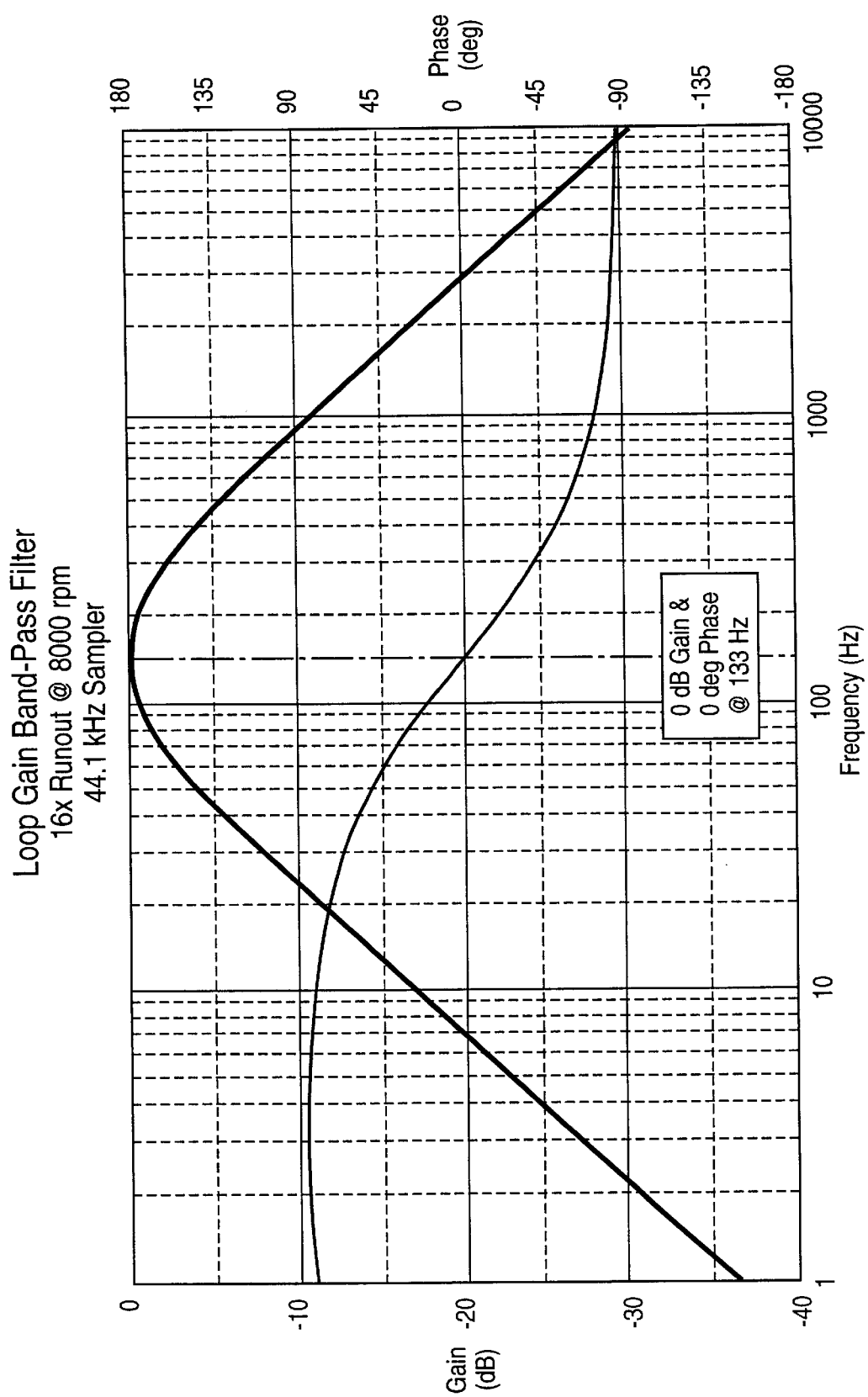
FIG. 7 is a typical frequency response plot for a prefilter as used in the second embodiment of the invention.

Prefilter 142 is a bandpass filter which, as noted above, eliminates noise, harmonics, phase-distortion and steady-state offset. For a 16× speed CD-ROM drive, a 133 Hz bandpass filter is selected (133 Hz representing the dominant frequency of the runout), whose frequency response is shown in FIG. 7. In this embodiment, bandpass prefilter 142 is originally used for another function of servo system 100; i.e., focus and tracking gain adjustment. Such use, however, is completed during initial calibration (i.e., start up) and is not thereafter used during the operation of the system. Accordingly, the embodiment of FIG. 3 "borrows" this filter from its other application through a series of control lines and switches and thereby avoids creating a second filter.

The samples of TOUT are recorded and played back by recording/playback component 144 under the control of microprocessor 134 (which selects/controls record and playback functions) and frequency generator 136 (for providing a sampling frequency). In the embodiment of FIG. 3A, component 144 is a digital read/write memory (i.e., DRAM, SRAM, etc.) with memory locations at least 10 bits wide, although other embodiments may be used as suggested above with respect to FIG. 2. Samples of TOUT may simply be "cleansed" by prefilter 142 before being stored in component 144. Accordingly, in one embodiment samples residing in component 144 are cleaner but otherwise unaltered from their original TOUT form. In an alternative embodiment, prefilter 142 may be used to modify the gain and/or phase of a sample as is well known in the art.

Gain adjust circuit 146 compensates for the variable angular speed of CD-ROM discs that typically rotate at constant linear velocity (CLV). With CLV, the speed of the disc motor varies depending upon the position of the optical data head (i.e., pickup) in relation to the center of the disc. More specifically, the angular speed of the disc can change by more than a factor of two between the tracks on the extreme inside and outside of the disc. Accordingly, microprocessor 134 constantly monitors track position and adjusts the gain of the calibrating drive signals (i.e., recorded samples) based on track position. Such adjustment may be determined, for example, from a look-up table or computed on the fly. On the other hand, for a drive using constant angular velocity (CAV), no adjustment in the gain is necessary (i.e., the gain remains at 1.0).

For example, if a sample is recorded at 8000 rpm, the gain remains at 1.0 if played back at 8000 rpm (i.e., in a pure CAV mode). However, if angular velocity is reduced in a CLV mode, circuit 146 must correct for the square of rpm (i.e. $rpm^2$) which is acceleration. So, if angular velocity is reduced from 8000 rpm on the inside of a disc to 4000 rpm somewhere near the outside, the gain adjust would be reduced to 0.25. Accordingly, in this example, gain is 1.0 at 8000 rpm and 0.25 at 4000 rpm.

When track searching in a CLV disc drive, gain adjust circuit 146 initially sets the gain corresponding to the target track.

As noted above, frequency generator 136 facilitates the recording and playing back of calibration drive signals at a fixed number of angular increments for each disc. These increments are to be repeatedly and reliably identified, although exact angular spacing is not required. Some methods of achieving angular feedback include: (1) monitoring of disc motor rotation through the use of hall effect sensors, (2) detecting back emf (electromotive force) from the windings of a disc motor or (3) use of an optical transducer disc. When motor rotation is relied upon for determining angular increments, samples are preferably retrieved at a rate of about 24 samples per disc revolution for an eight-pole, three-phase motor; 36 samples per disc revolution for a twelve-pole, three-phase motor; or multiples thereof. Of these, 36 samples per revolution is currently the preferred rate. However, when using an optical transducer disc, any number of samples (and therefore angular increments) may be used per revolution subject to quality requirements.

PROCEDURE

Figure 8A:
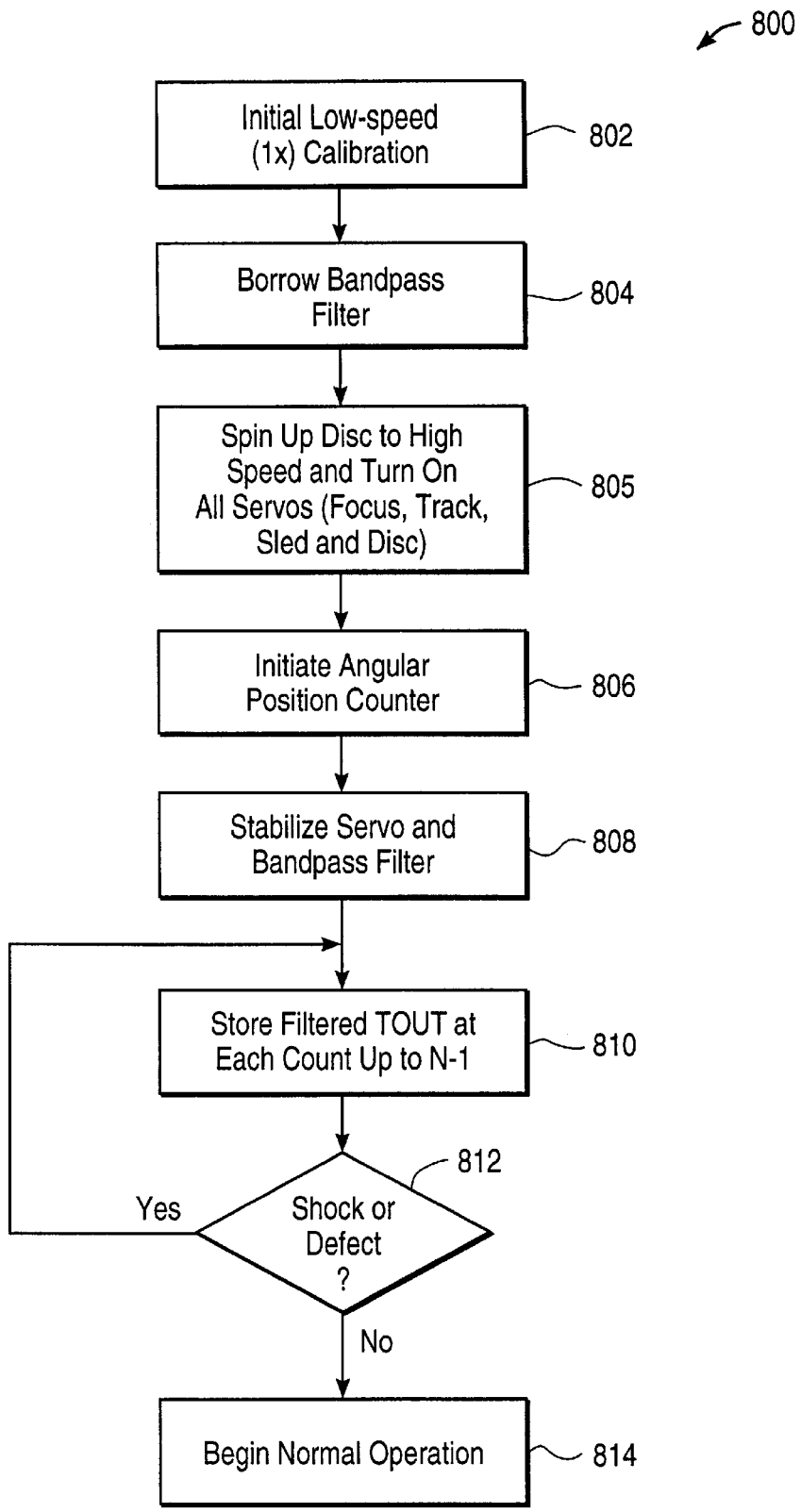
FIGS. 8A and 8B are flow charts of record and play back procedures in accordance with the principles of the present invention.
Figure 8B:
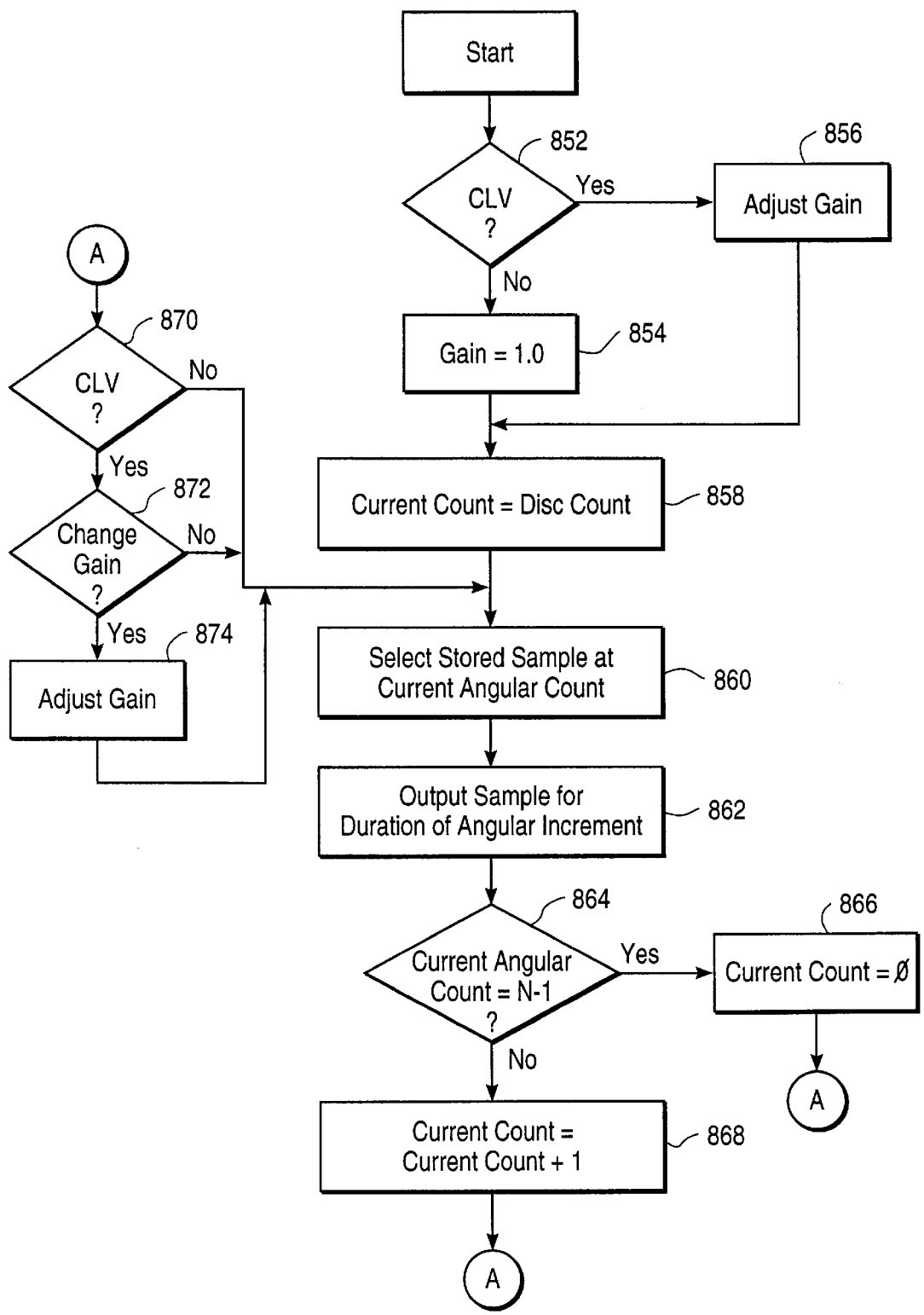

FIGS. 8A and 8B illustrate a method for recording and playing back calibration drive signals according to the present invention. Referring to flow chart 800 of FIG. 8A, a disc drive system incorporating runout calibration in accordance with the present invention is initially calibrated (i.e., standard start-up operation), pursuant to block 802. Next, a bandpass filter performing a separate function within the disc drive system is re-coupled between equalizer 116 and recorder/playback component 144 (FIG. 3A) in accordance with block 804. Next, pursuant to block 805, the disc is spun up to a high speed (e.g., greater than maximum operating speed), and all servos are turned on (e.g., focus, track, sled and disc). As is well known, focus servos control the vertical relationship between a data head and a disc, and disc servos facilitate CLV and CAV operation. Control then flows to block 806 in which angular position counter is initiated (i.e., the number of measurements per revolution is established). Next, pursuant to block 808, the subject disc drive system rotates the disc through several revolutions (e.g., 3 or 4) until the bandpass filter and system servo loop(s) are stabilized in a track-following operation.

Once stabilized, control flows to blocks 810 and 812 wherein a sampled and filtered TOUT signal (FIG. 3A) is stored within a recorder/playback component at each angular increment (representing a fixed angle of disc rotation) for N angular counts (described below) during the track-following operation. In the preferred embodiment, this recordation takes place during a single revolution of the rotatable disc. If, however, the system experiences a shock (i.e., a physical blow creating an exaggerated offset) or a defect in the disc itself (which creates an erroneous TOUT signal), block 812 returns control to block 810 to repeat the storing operation.

Once all N samples of TOUT are stored, normal disc drive operation may begin.

Referring to FIG. 8B, play-back operation of recorded samples of TOUT (i.e., calibration drive signals) for normal play and fine search begins with an initial determination of whether the subject disc drive system is CLV pursuant to block 852. If yes, gain adjust circuit 146 (FIG. 3A) is accessed by microprocessor 134 in accordance with block 856 to compensate for variations in angular velocity based upon the position of the optical data head. If not (i.e., the system is CAV), the gain remains at or is set to one (1.0), pursuant to block 854.

To identify recorded samples of specific angular increments, an "angular count" may be used ranging from 0 to N−1, where N is the number of periodic angular increments (as well as counts) for one revolution. For example, where N=36, each angular increment is about 10 degrees and is associated with an angular count numbered between 0 and 35, inclusive.

Pursuant to block 858, a "current" angular count used to access a recorder/playback (FIG. 3A) to retrieve stored samples is set equal to the angular count of a disc undergoing rotation (so to coordinate with stored samples at specific angular increments). A corresponding stored sample is selected at block 860 using the current angular count and the retrieved sample is output at block 862. During output, the retrieved sample passes through gain adjust 146 (FIG. 3A) and remains active for the duration of the associated angular increment (i.e., the time it takes the subject rotatable disc to rotate through this angular increment). At or before expiration of this increment, a new current angular count is selected pursuant to blocks 864–868.

Pursuant to blocks 864 and 866, if the current angular count equals N (the maximum number of counts allowed in one disc revolution), the current count is re-set to zero and control returns to block 870. Alternatively, the current count is increased by one pursuant to block 868, and control returns to block 870.

At block 870, if the subject drive is CLV (as determined at block 852), control flows to block 872 to determine whether the data head has moved laterally a sufficient distance to warrant a gain change. If yes, gain adjust 146 (FIG. 3A) is accessed to modify the gain applied to output samples pursuant to block 874 and thereafter control flows to block 860. If not, control returns to block 860 without any gain adjustment for continued processing as described above. Alternatively, if the subject drive is not CLV, control flows immediately from block 870 to block 860 for continued processing.

PERFORMANCE

Figure 9A:
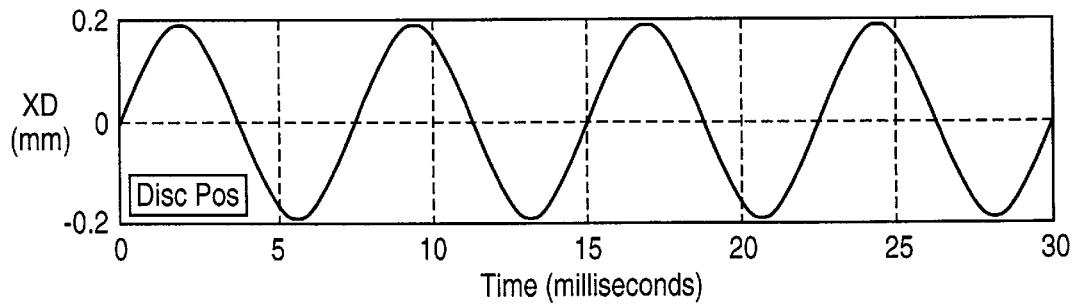
FIGS. 9A–9D are charts of select data and signals produced in a simulation of the system of FIG. 3A during normal play (i.e., track following).
Figure 9B:
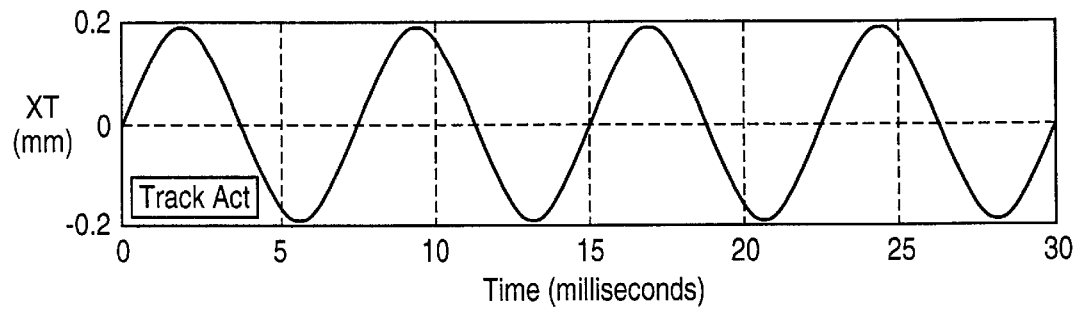
Figure 9C:
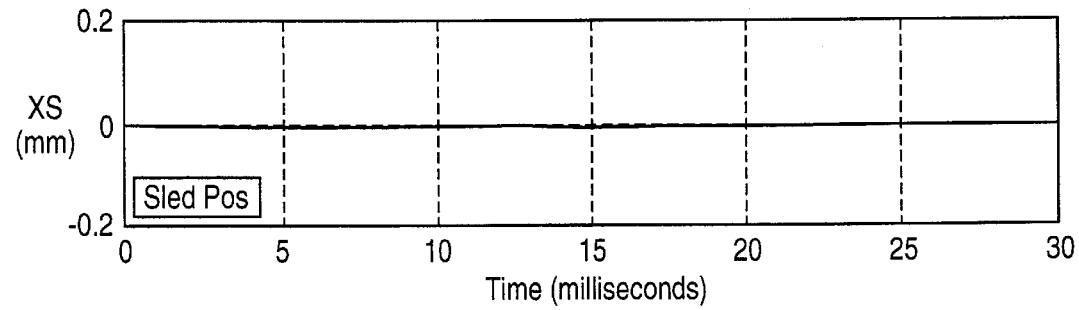
Figure 9D:
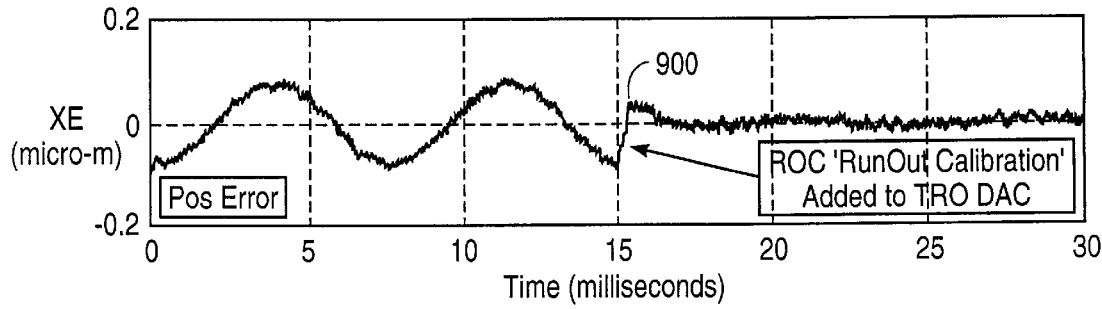

FIGS. 9A–9D illustrate the relationship of position input XD, position output XT and position error XE of FIG. 3A both with and without the use of runout calibration in accordance with the invention. FIGS. 9A and 9B represent XD and XT, respectively, in a track following operation. FIG. 9C illustrates negligible movement from sled mechanics 104 (FIG. 3A). FIG. 9D shows initial positional error between XD and XT of about +/−0.1 microns resulting from disc runout. This positional error, however, is significantly reduced at point 900 with the addition of calibration drive signals to TOUT pursuant to the embodiment of FIG. 3A.

FIGS. 10A–10D illustrate simulation results of the embodiment in FIG. 3A during track following and track searching operations for a 12× CD-ROM drive without runout calibration. FIG. 10A represents physical disc runout with a frequency of 100 Hz and an amplitude of +/−180 micrometers FIG. 10B represents signal TE during track following operations (about 0–10, 13–32.5 and 41–50 milliseconds) and track searching operations (about 10–13 and 32.5–41 milliseconds). The slight sinusoidal motion during track following represents error created by the limited bandwidth of the track-following servo loop; i.e., this servo loop cannot completely follow the physical runout of the disc. As a result, there will be an error or misposition by the optical data head off the center of the subject track.

Referring again to FIG. 10B, track searching at 10–13 milliseconds represents a 32 track fine search (each TE triangle wave cycle represents one track crossing) which begins when the disc runout phase is approximately zero (i.e., XD plot in FIG. 10A is simultaneously crossing the horizontal axis) but moving at peak velocity. In this instance, the 32 track search and track runout move in opposite directions as the search commences. As a result, track crossings occur at a much higher frequency (due to the relative velocity of the data head) which ultimately results in a one-track overshoot. In short, the relative velocity between the tracks and the data head being controlled by a track-searching servo loop is beyond the capacity of the loop. This is further illustrated in FIG. 10C which shows a TKIC signal gradually being ramped up in an ultimately unsuccessful attempt to slow down the search before missing the target.

Referring again to FIG. 10B, track searching at 32.5–41 milliseconds represents another 32 track fine search which begins when the disc runout phase is approximately 90 degrees, placing the runout at a maximum offset but minimum velocity (i.e., at about 32.5 milliseconds). In this instance, both the search and runout move in the same direction which ultimately results in a stall because no track crossing is registered in an allotted window of time.

Now, turning to FIGS. 11A–11D, the same track following and track searching operations for the same CD-ROM drive are illustrated, but with runout calibration added according to the invention. Here, the normal play regions (i.e., track following) no longer have a slight sinusoidal error. In addition, both search operations successfully lock onto a target track without mishap.

Figure 12A:
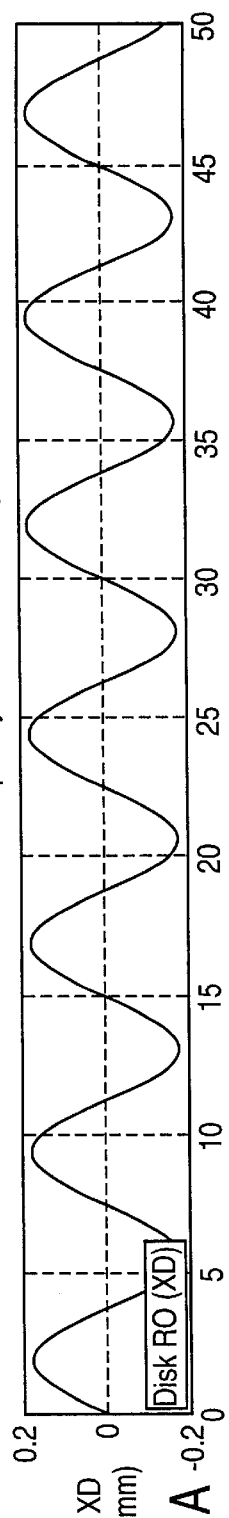
FIGS. 12A–12D are charts representing performance simulation of a 16× CD-ROM drive system without runout calibration during normal play and fine search.
Figure 12B:
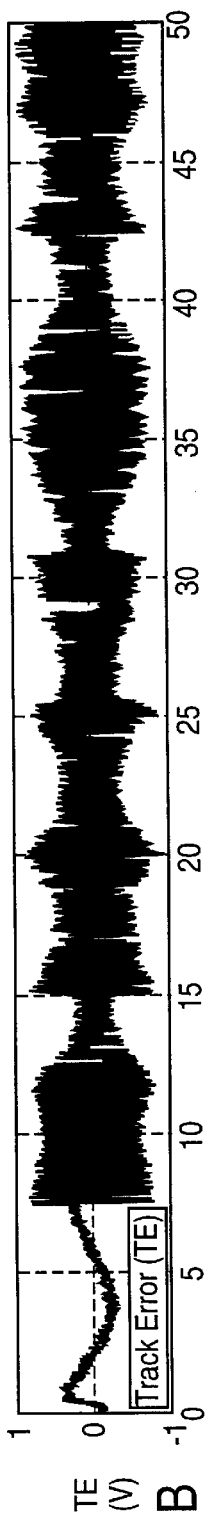
Figure 12C:
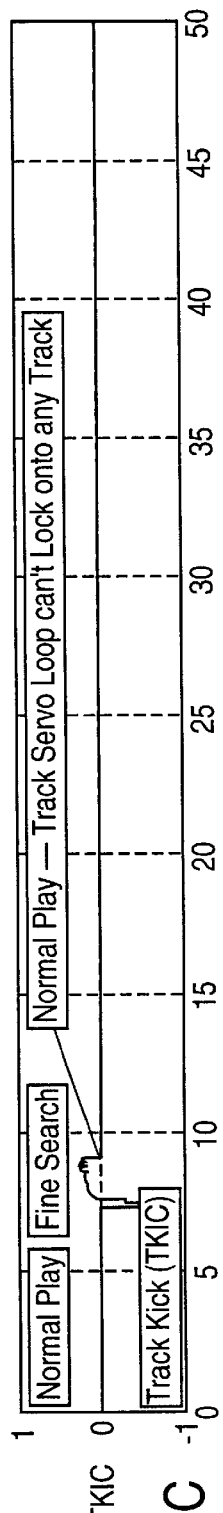
Figure 12D:
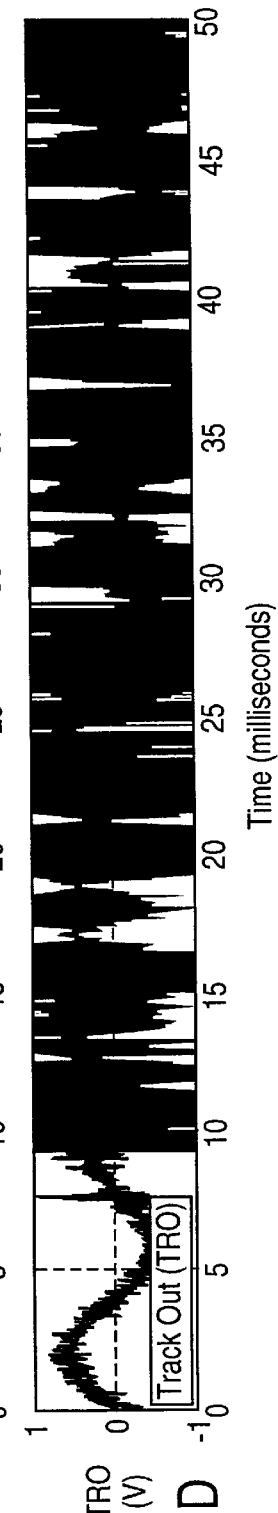
Figure 13A:
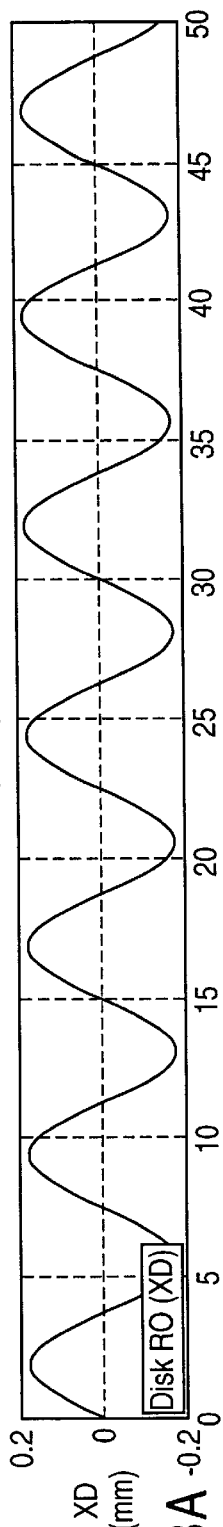
FIGS. 13A–13D are charts representing performance simulation of a 16× CD-ROM drive system with runout calibration in accordance with the present invention during normal play and fine search.
Figure 13B:
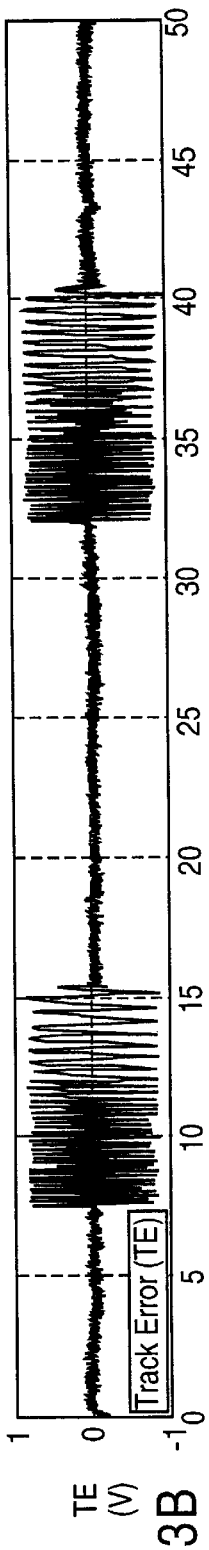
Figure 13C:
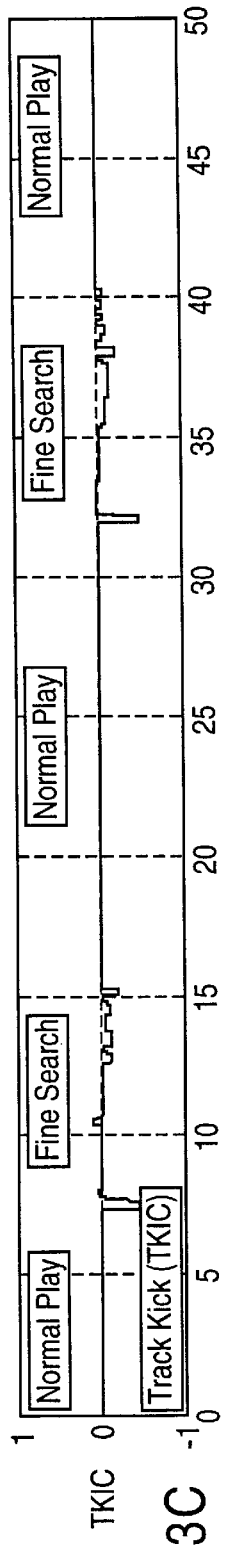
Figure 13D:
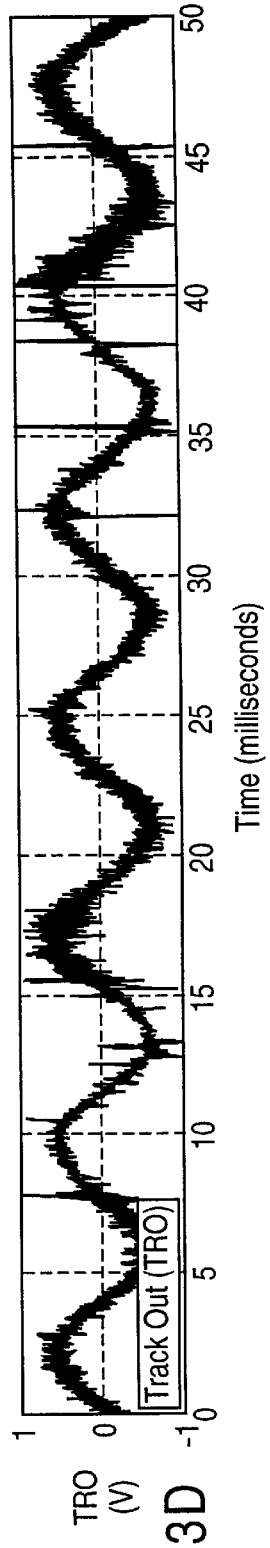

FIGS. 12A–D and 13A–D provide a more dramatic demonstration of the benefits of the invention. FIGS. 12A–12D illustrate simulation results of the embodiment in FIG. 3A during track following and track searching operations for a 16× CD-ROM drive without runout calibration. As shown in FIG. 12B, significant sinusoidal motion is present during normal play indicating significant positional error for track following. Moreover, track searching results in a failed search from which the track-following servo loop cannot recover. In contrast, this same system with runout calibration in accordance with the invention results in successful track following and track searching, as illustrated in FIGS. 13A–D.

Figure 14A:
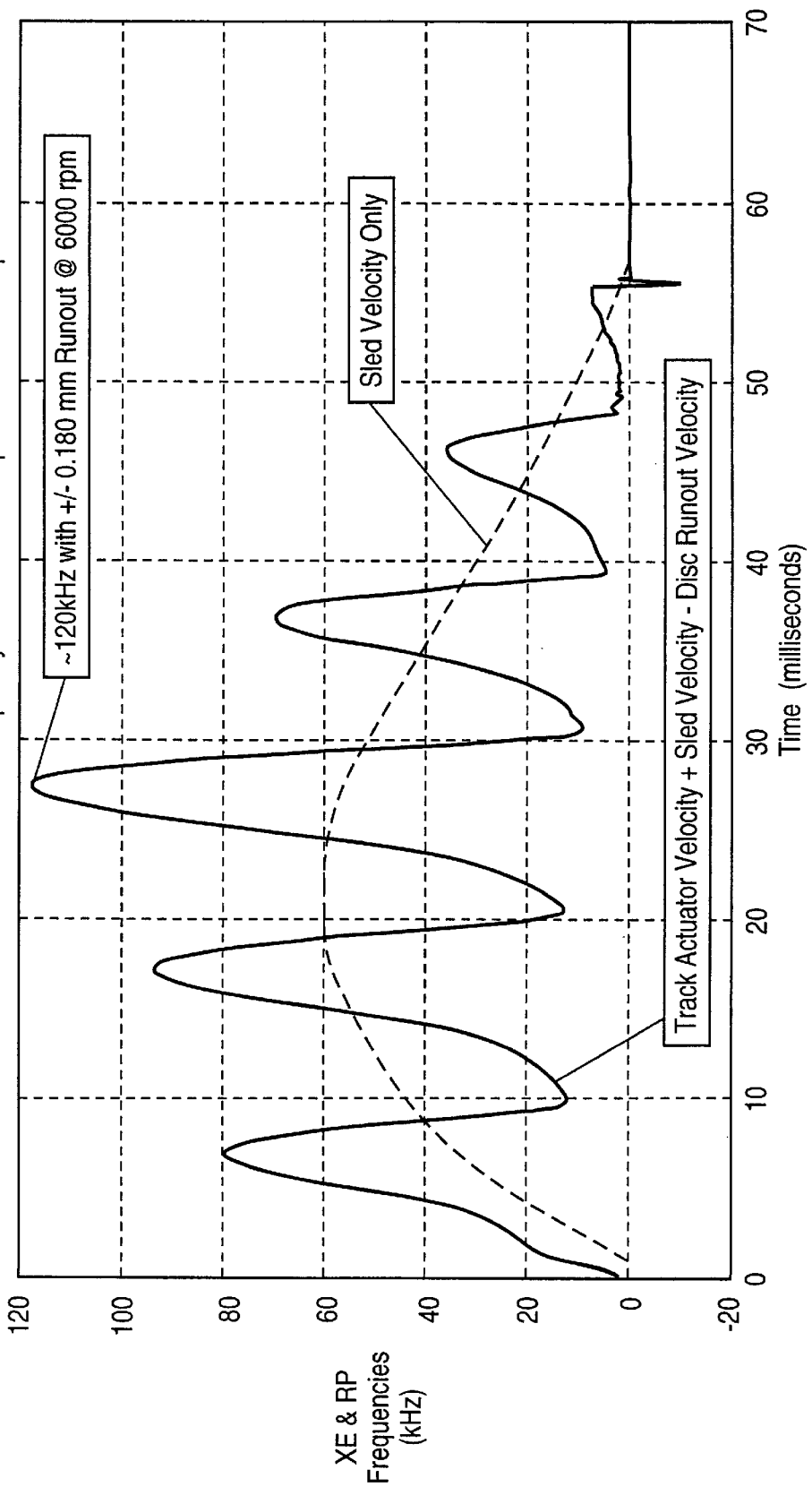
FIGS. 14A and 14B are charts illustrating relative velocities of data head and disc tracks in fine search operations both without and with runout calibration in accordance with present invention.
Figure 14B:
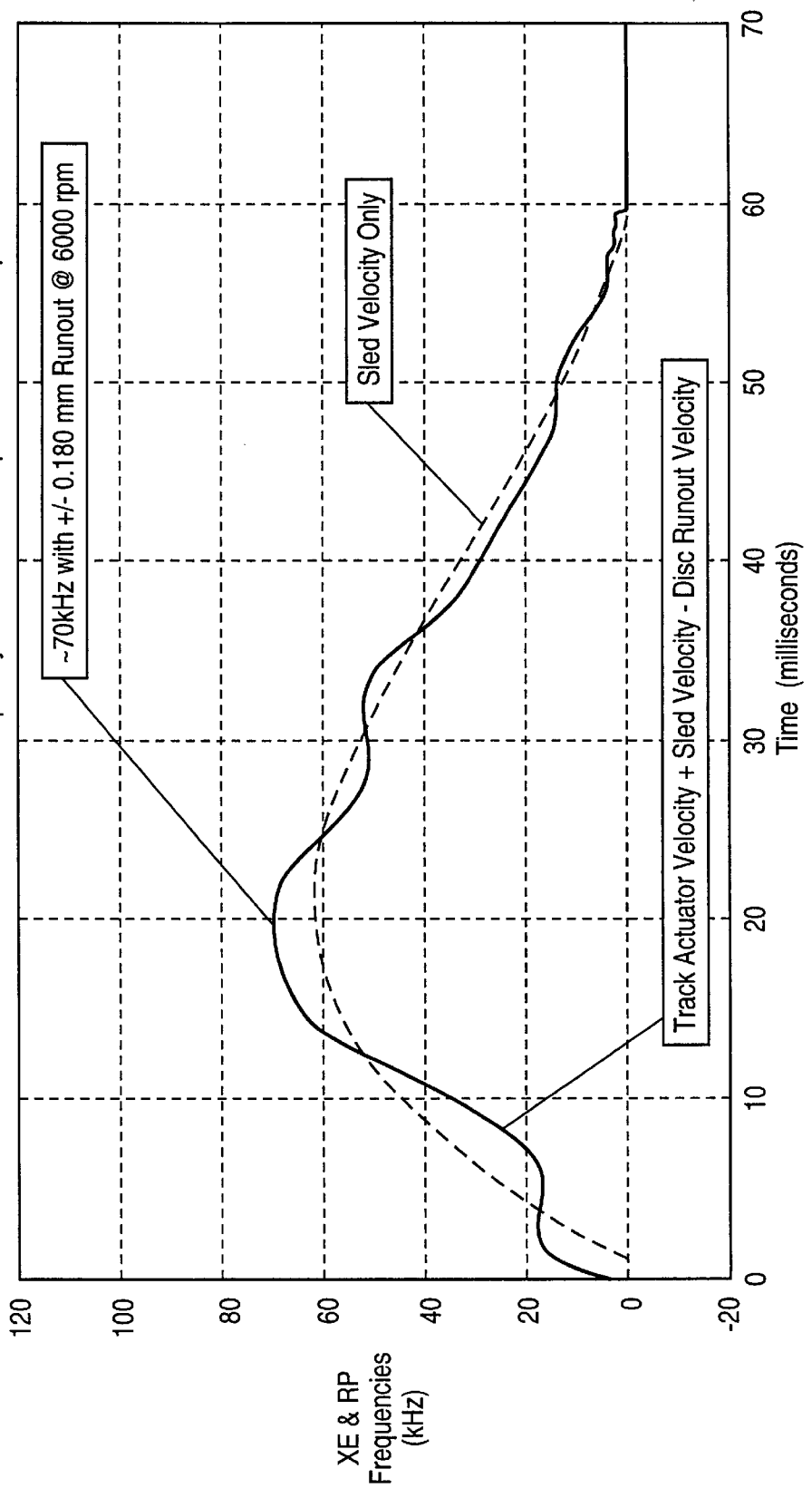

Finally, FIG. 14A illustrates the large gyrations in relative velocity experienced by a data head that is subject to disc runout during a fine search without runout calibration as described herein. The relative velocity of the head results in track crossing frequencies upward to about 120 kHz. In contrast, by incorporating runout calibration in accordance with the present invention, maximum track crossing frequencies are reduced to about 70 kHz, as shown in FIG. 14B.

Figure 11A:
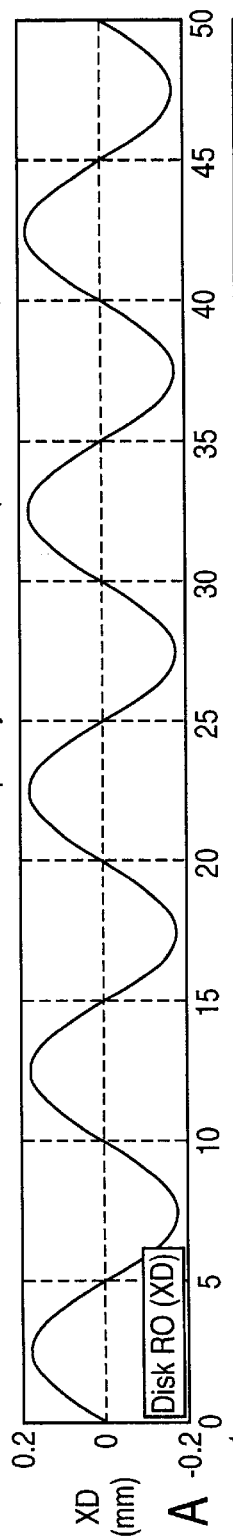
FIGS. 11A–11D are charts representing performance simulation of a 12× CD-ROM drive system with runout calibration in accordance with the present invention during normal play and fine search.
Figure 11B:
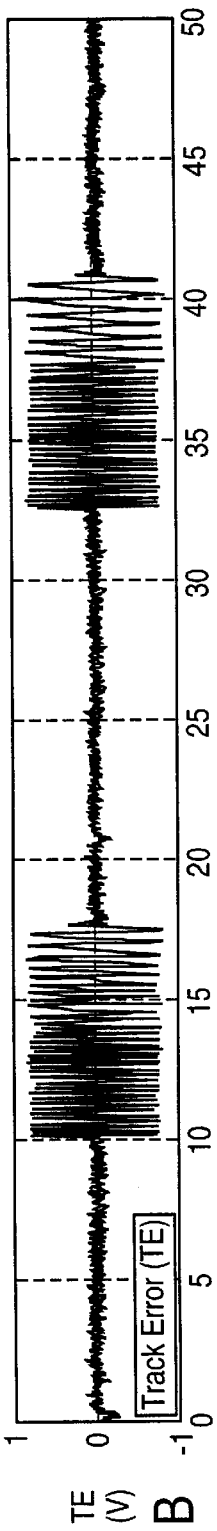
Figure 11C:
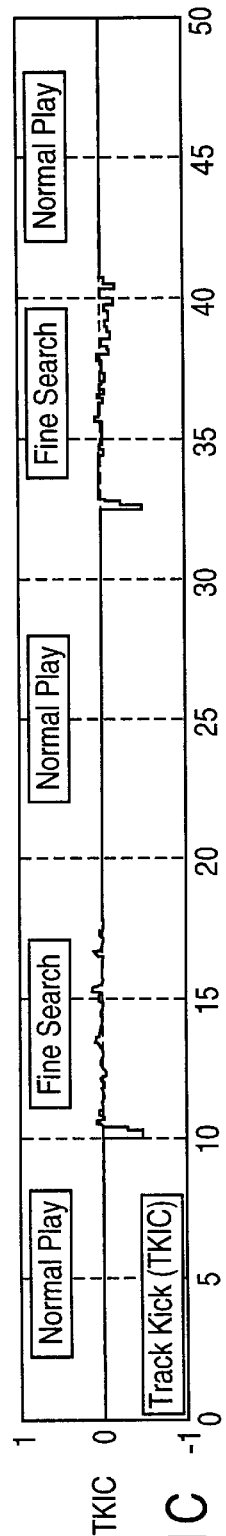
Figure 11D:
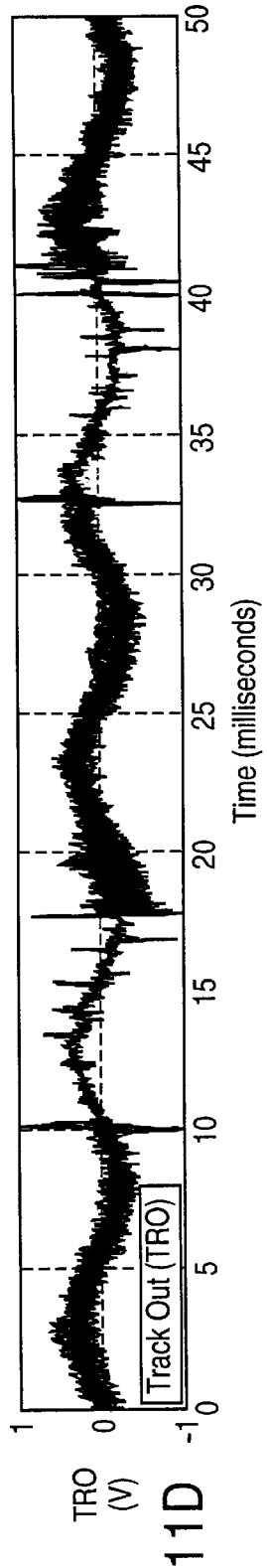

In summary, runout calibration, in accordance with the present invention, results in a number significant benefits for servo systems disposed within disc drive systems. First, during normal play, runout calibration greatly reduces tracking error without increased bandwidth. This is illustrated in FIGS. 10B, 11B, 12B and 13B. Second, during low-speed fine search landing, runout calibration reduces stall and track overshoot problems. This is illustrated in FIGS. 10B and 11B. Finally, during high-speed fine search, runout calibration reduces track crossing frequency and, therefore, eases track counting burdens. This is illustrated in the peak frequency reduction disclosed in FIGS. 14A and 14B.

While the foregoing is a complete description of the embodiments of the invention, various modifications, alternatives and equivalents may be used. Accordingly, the above description should not be taken as limiting the scope of the invention which is defined by the appended claims.

What is claimed is:

1. In a data-storage device that includes a rotatable disc and a data head for accessing the disc, a runout calibration system comprising:

positioning mechanics coupled to the head for moving the head relative to the disc;

a servo loop incorporating said positioning mechanics and generating a first drive signal used to control said positioning mechanics; and a memory having an input and an output coupled to said loop for recording a plurality of samples of said first drive signal at a plurality of periodic angular increments of the disc during one or more rotations of the disc, wherein said input is coupled to said loop at only one node when recording, and repeatedly playing back said samples into said loop at said plurality of periodic angular increments during multiple rotations of the disc that are subsequent to said one or more rotations, wherein each of said plurality of samples is recorded and played back at the same periodic angular increment and each of said samples is retained without modification in said memory during playback.

2. The runout calibration system of claim 1 further comprising a frequency generator coupled to said memory for defining said periodic angular increments.

3. The runout calibration system of claim 2 further comprising a prefilter coupled to said input of said memory, wherein said memory contains filtered samples of said first drive signal, said samples remaining otherwise unaltered.

4. The runout calibration system of claim 3 further comprising a gain-adjustment circuit coupled to said output of said memory.

5. The runout calibration system of claim 2 wherein said prefilter is a bandpass filter.

6. The runout calibration system of claim 1 further comprising a first summing junction disposed within said feedback loop, said first summing junction sequentially summing said plurality of samples with a then-current drive signal over said plurality of periodic angular increments.

7. The runout calibration system of claim 6 wherein each of said periodic angular increments approximately equals an angular distance of ten degrees of one rotation of said rotatable disc.

8. The runout calibration system of claim 7 further comprising a second summing junction disposed upstream of said first summing junction within said servo loop, said second summing junction defining a physical positional error of said data head relative to said rotatable disc which is a precursor to said then-current drive signal.

9. A system comprising:

a rotatable disc containing data;

a data head disposed proximate to said disc;

positioning mechanics coupled to the head for moving said head relative to said disc;

a first servo loop for generating a track-following signal operable to control said positioning mechanics;

a second servo loop for generating a track-searching signal operable to control said positioning mechanics; and a memory having an input and an output coupled to said first and second loops for recording a plurality of samples of said track-following signal at a plurality of periodic angular increments of the disc during one or more rotations of the disc, wherein said input is coupled to said first loop at only one node when recording, and repeatedly playing back said samples into said first and second loops at said plurality of periodic angular increments during multiple rotations of the disc that are subsequent to said one or more rotations, wherein each of said plurality of samples is recorded and played back at the same periodic angular increment and each of said samples is retained without modification in said memory during playback.

10. The system of claim 9 wherein said samples are played back into said first loop when said positioning mechanics are engaged in a track-following operation.

11. The system of claim 9 wherein said samples are played back into said second loop when said positioning mechanics are engaged in a track-searching operation.

12. The system of claim 11 wherein said track-searching operation is a fine search.

13. The system of claim 9 further comprising:
 a bandpass filter coupled to said input of said memory; and
 a gain-adjustment circuit coupled to said output of said memory.

14. The system of claim 9 further comprising:
 a D/A converter for converting said track-following signal; and
 an amplifier for amplifying said track-following signal having an input and an output, said amplifier input coupled to said D/A converter and said amplifier output coupled to said positioning mechanics which respond to said track-following signal by positioning said data head.

15. The system of claim 9 further comprising a frequency generator for defining said periodic angular increments.

16. A method for performing a search for a target track on a rotatable disc comprising the steps of:
 retrieving from a single node in a servo loop a plurality of samples of a first signal used to position a data head over the disc at a plurality of fixed angles of disc rotation;
 recording each of said plurality of samples;
 initiating a search for the target track;
 generating a second signal to move said data head toward the target track; and
 repeatedly summing said second signal with said recorded plurality of samples at said plurality of fixed angles of disc rotation over a plurality of disc rotations to produce a third signal which is used to move said data head toward the target track, wherein each of said plurality of samples is retrieved and summed at the same fixed angle and each of said samples is retained without modification in said memory during said summing.

17. The method of claim 16 wherein said retrieving is carried out in a track-following operation.

18. The method of claim 17 further comprising adjusting gain of one of said plurality of samples to compensate for variable rotational velocity of the disc.

19. The method of claim 16 further comprising filtering said plurality of samples before recording each of said samples.

20. The method of claim 19 wherein said filtering comprises averaging values of said plurality of samples with multiple samples retrieved over several disc rotations.

* * * * *